(12) United States Patent
Yonezawa

(10) Patent No.: US 8,248,645 B2
(45) Date of Patent: Aug. 21, 2012

(54) PRINTING SYSTEM, PRINTING DEVICE, HOST APPARATUS, AND COMPUTER PROGRAM PRODUCT

(75) Inventor: Hozumi Yonezawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 655 days.

(21) Appl. No.: 12/379,852

(22) Filed: Mar. 3, 2009

(65) Prior Publication Data

US 2009/0225354 A1    Sep. 10, 2009

(30) Foreign Application Priority Data

Mar. 7, 2008  (JP) ................................ 2008-057682
Jan. 14, 2009  (JP) ................................ 2009-005596

(51) Int. Cl.
 *G06F 3/12*    (2006.01)
(52) U.S. Cl. ...................................................... 358/1.15
(58) Field of Classification Search ......................... None
See application file for complete search history.

(56) References Cited

U.S. PATENT DOCUMENTS

| 5,812,747 | A  | * | 9/1998 | Kayano et al. | ............... | 358/1.15 |
| 7,474,423 | B2 | * | 1/2009 | Garcia et al. | ................. | 358/1.15 |
| 7,692,805 | B2 | * | 4/2010 | Shima | ........................... | 358/1.14 |
| 2004/0057075 | A1 | * | 3/2004 | Stewart et al. | ............... | 358/1.15 |

FOREIGN PATENT DOCUMENTS

| JP | 2003-271347 | 9/2003 |
| JP | 2007-272832 | 10/2007 |
| JP | 2007-272833 | 10/2007 |

* cited by examiner

*Primary Examiner* — Marivelisse Santiago Cordero
*Assistant Examiner* — John Wallace
(74) *Attorney, Agent, or Firm* — Harness, Dickey & Pierce, P.L.C.

(57) ABSTRACT

A printing system includes a host apparatus and two or more printer devices connected to each other via a network. The host device sends print data to the printer devices. If a network disconnection occurs while the host device is sending the print data to the printer devices, the printing devices maintain a session with the host device and keep the print data that has been received at a time point before the network disconnection occurred. When a network reconnection takes place, the printer devices receive only un-received print data from the host device.

9 Claims, 22 Drawing Sheets

FIG. 12

PAGE INFORMATION TABLE

| BASIC INFORMATION | → | JOB ID<br>NUMBER OF<br>PRINTED PAGES | JOB ID<br>TOTAL NUMBER OF PRINTED PAGES<br>AT ALL PRINTERS |
|---|---|---|---|
| TOTAL NUMBER OF PRINTERS | | | |
| PRINTER INFORMATION OF EACH PRINTER | → | IP ADDRESS<br>JOB ID<br>NUMBER OF<br>PRINTED PAGES | IP ADDRESS OF EACH PRINTER<br>SYNCHRONIZED JOB ID OF PRINT JOB AT EACH PRINTER<br>NUMBER OF PAGES PRINTED AT EACH PRINTER |

FIG. 13

ERROR INFORMATION TABLE

| BASIC INFORMATION | → | ERROR CODE<br>JOB ID SUBJECT TO<br>ERROR | ERROR CODE OF ERROR WHILE PRINTING<br>JOB ID SUBJECT TO ERROR WHILE PRINTING |
|---|---|---|---|
| TOTAL NUMBER OF FAULTY PRINTERS | | | |
| PRINTER INFORMATION OF EACH FAULTY PRINTER | → | IP ADDRESS<br>ERROR CODE<br>JOB ID SUBJECT TO<br>ERROR | IP ADDRESS OF EACH PRINTER<br>ERROR CODE OF ERROR AT EACH PRINTER<br>SYNCHRONIZED JOB ID SUBJECT TO ERROR<br>AT EACH PRINTER |

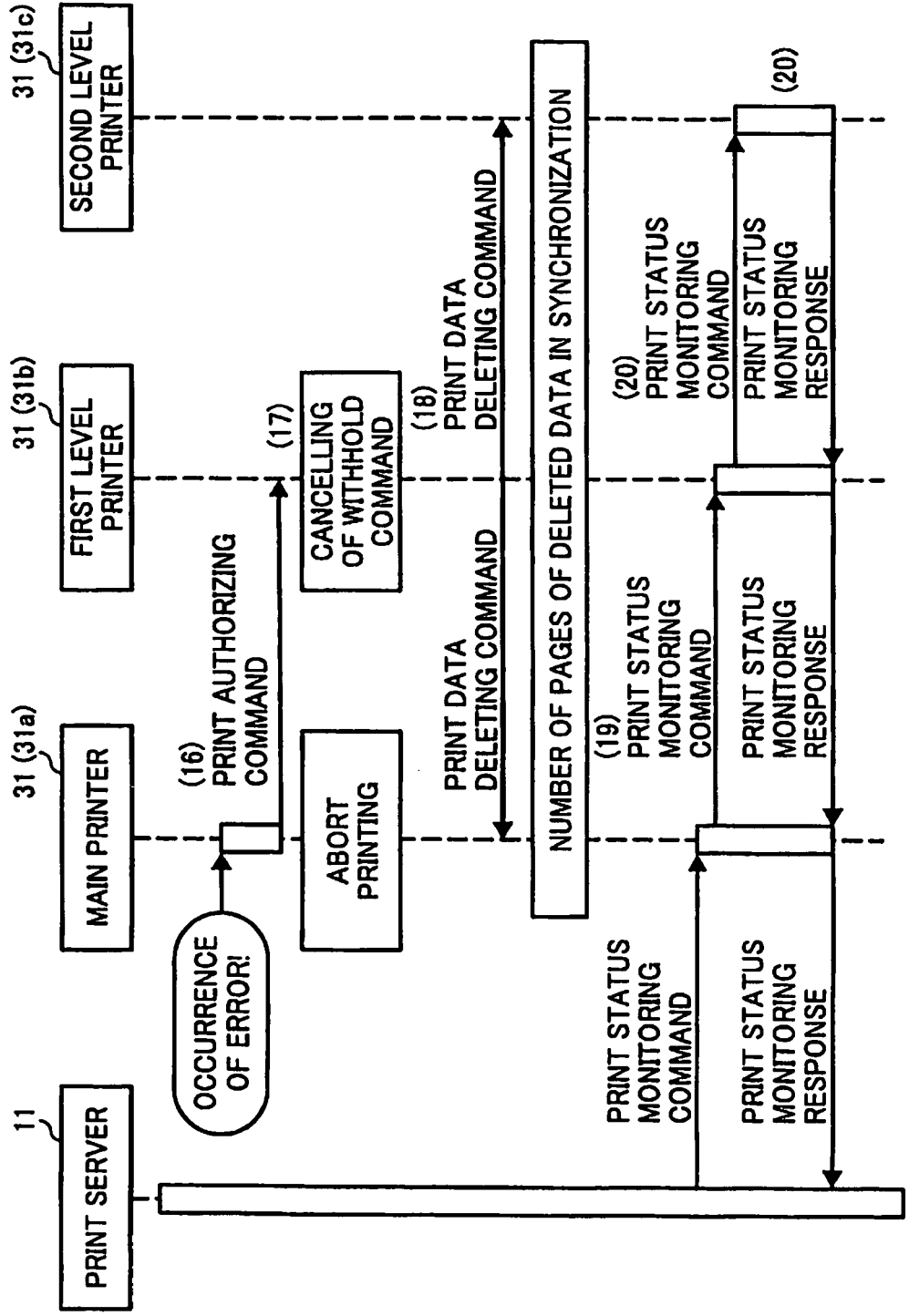

FIG. 18

- JOB ID: 0003
- DOCUMENT NAME: DOCUMENT 3
- TOTAL NUMBER OF PRINTED PAGES: 10

IP ADDRESS: 1.1.1.1
FIRST PRINTED PAGE: 00001
LAST PRINTED PAGE: 00005
NUMBER OF PRINTED PAGES: 00005
ERROR: PAPER-OUT CONDITION

IP ADDRESS: 1.1.1.2
FIRST PRINTED PAGE: 00006
LAST PRINTED PAGE: 00008
NUMBER OF PRINTED PAGES: 00003
ERROR: PAPER JAM CONDITION

IP ADDRESS: 1.1.1.3
FIRST PRINTED PAGE: 00009
LAST PRINTED PAGE: 00010
NUMBER OF PRINTED PAGES: 0002
ERROR:

PRINTING SYSTEM, PRINTING DEVICE, HOST APPARATUS, AND COMPUTER PROGRAM PRODUCT

CROSS-REFERENCE TO RELATED APPLICATIONS

The present application claims priority to and incorporates by reference the entire contents of Japanese priority document 2008-057682 filed in Japan on Mar. 7, 2008 and Japanese priority document 2009-005596 filed in Japan on Jan. 14, 2009.

BACKGROUND OF THE INVENTION

1. Field of the Invention

The present invention relates to a network printing technology.

2. Description of the Related Art

In recent years, a network printing technology is being actively developed. For example, Japanese Patent Application Laid-open No. 2003-271347 discloses a network printing system in which printing is performed at a printer connected to a network such as Internet.

FIG. 24 is a schematic diagram for explaining a conventional network printing system. The network printing system in FIG. 24 is configured as an extranet environment in which an intranet environment 200 is connected to another intranet environment 300 via a network 400. In such a configuration, it is possible to carry out a print job at a printer arranged in the intranet environment 300 by giving a printing instruction from a host computer arranged in the intranet environment 200, and vice versa.

However, during a printing process, there is a possibility that an error such as a paper-out condition, a paper jam condition, or a toner empty condition occurs in the printer thereby causing interruption in the printing process. If the host computer is not notified about such an error, then there is a possibility that the problem is left unattended.

Internet quality affects reliability of the printing in the conventional network printing system that is configured as the extranet environment. For example, if the transmission-line conditions are poor, network delay and/or network disconnection may occur frequently. Frequent network delays and network disconnections result in frequent network reconnections. Data re-transmission occurring at each network reconnection disadvantageously increases the load on the server.

SUMMARY OF THE INVENTION

It is an object of the present invention to at least partially solve the problems in the conventional technology.

According to an aspect of the present invention, there is provided a printing system including a host apparatus connected to a network; and at least two printer devices connected to the network and that receive a print job including print data and a series of process commands from a host apparatus and print the print job in accordance with the process commands. A first printer device among the printer devices including a session setup unit that sets up a session between the host apparatus and a second printer device among the printer devices, receives a print job from the host apparatus, stores the print job, and sends the print job to the second printer device; a job synchronizing unit that maintains, when the first printer device is printing the print job, synchronization between the print job that has been stored in the first printer device and the print job that has been stored in the second printer device; and a network-disconnection preparation unit that takes measures, when a network disconnection occurs between the host apparatus, so as not to cancel the print job that has been stored in each of the first printer device and the second printer device and not to close the session that has been setup between the host apparatus and the second printer device. The host apparatus including a sending unit that sends, when a network reconnection takes place after the network disconnection between the first printer device, only un-received print data to the first printer device by referring to the print data in the print job that has been stored in the first printer device, the un-received print data being print data that the first printer device could not receive from the host apparatus due to the network disconnection.

According to another aspect of the present invention, there is provided a printer device that is connected to a host apparatus via a network, receives a print job including print data and a series of process commands from the host apparatus, and prints the print job in accordance with the process commands. The printer device includes a session setup unit that sets up a session with the host apparatus and an external printer device, receives a print job from the host apparatus, stores the print job, and sends the print job to the external printer device; a job synchronizing unit that maintains, when the printer device is printing the print job, synchronization between the print job that has been stored in the printer device and the print job that has been stored in the external printer device; a network-disconnection preparation unit that takes measures, when a network disconnection occurs between the host apparatus, so as not to cancel the print job that has been stored in the printer device and not to close the session that has been setup between the host apparatus and the external printer device; and a response unit that sends, in response to an inquiry received from the host apparatus when a network reconnection takes place after the network disconnection between the printer device, total number of pieces of the print data that have been stored in the printer device to the host apparatus.

According to still another aspect of the present invention, there is provided a host apparatus that is connected to the above printer device via a network and that sends a print job including print data and a series of process commands to the printer device. The host apparatus including an inquiring unit that sends, when a network reconnection takes place after a network disconnection between the printer device, an inquiry to the printer device about a status of print data that has been received by the printer device at a time point the network disconnection occurred; and a sending unit that sends, by referring to a response corresponding to the inquiry received from the printer device, un-received print data to the printer device, the un-received print data being print data that the printer device could not receive from the host apparatus due to the network disconnection.

According to still another aspect of the present invention, there is provided a computer program product that includes a computer program which when executed on a computer causes the computer to control the above printer device that is connected to a host apparatus via a network, receives a print job including print data and a series of process commands from the host apparatus, and prints the print job in accordance with the process commands. The computer program causing the computer to execute setting up a session with the host apparatus and an external printer device, receiving a print job from the host apparatus, storing the print job, and sending the print job to the external printer device; maintaining, when the printer device is printing the print job, synchronization between the print job that has been stored in the printer device and the print job that has been stored in the external printer device; taking measures, when a network disconnection occurs between the host apparatus, so as not to cancel the print job that has been stored in the printer device and not to close the session that has been setup between the host apparatus and the external printer device; and sending, in response to an inquiry received from the host apparatus when a network reconnection takes place after the network disconnection between the printer device, total number of pieces of the print data that have been stored in the printer device to the host apparatus.

According to still another aspect of the present invention, there is provided a computer program product that includes a computer program which when executed on a computer causes the computer to control a host apparatus that is connected to the above printer device via a network and that sends a print job including print data and a series of process commands to the printer device. The computer program causing the computer to execute sending, when the network reconnection takes place after a network disconnection between the printer device, an inquiry to the printer device about a status of print data that has been received by the printer device at a time point the network disconnection occurred; and sending, by referring to a response corresponding to the inquiry received from the printer device, un-received print data to the printer device, the un-received print data being print data that the printer device could not receive from the host apparatus due to the network disconnection.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram for explaining an exemplary page information table maintained in the printer server;

FIG. 13 is a diagram for explaining an exemplary error information table maintained in the printer server;

FIG. 14 is a sequence diagram of an exemplary substitutive printing process when an error occurs in the main printer while printing the print data;

FIG. 18 is a diagram of an exemplary print report generated during the print report generating process;

DETAILED DESCRIPTION OF THE PREFERRED EMBODIMENTS

Exemplary embodiments of the present invention are described in detail below with reference to the accompanying drawings. A laser printer or a multifunction peripheral (MFP) is used as a printing device to explain the following embodiments.

Figure 1:
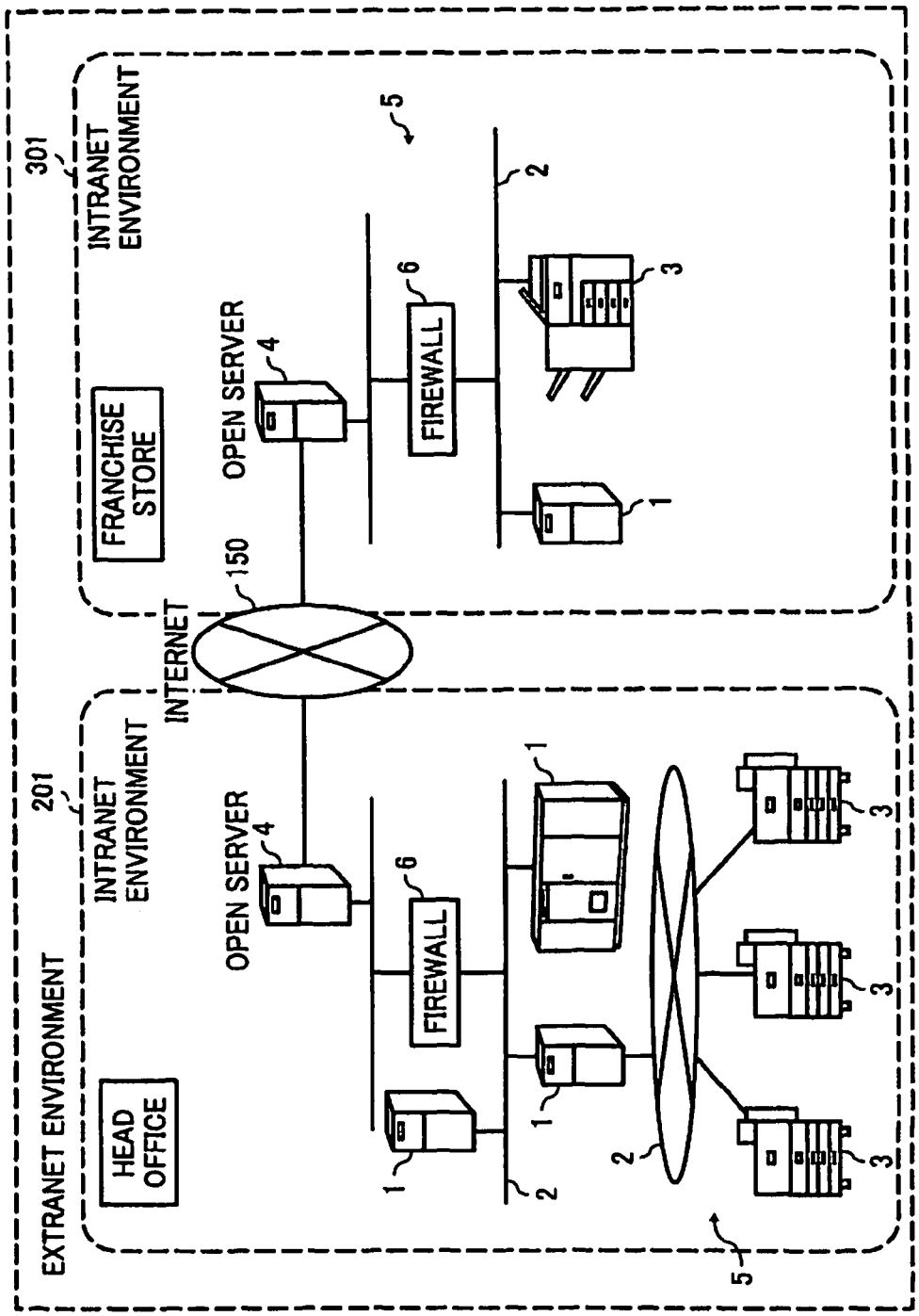
FIG. 1 is a schematic diagram of a network printing system according to an embodiment of the present invention.

FIG. 1 is a schematic diagram of a network printing system 100 according to an embodiment of the present invention. The network printing system 100 is configured as an extranet environment in which an intranet environment 201 is connected to an intranet environment 301 via an external network 150 such as Internet. Each of the intranet environments 201 and 301 is assumed to be, although not limited to, an in-house network environment of a business establishment configured based on Internet technology.

For example, the intranet environment 201 is assumed to be the in-house network environment of a head office of a convenience store chain, while the intranet environment 301 is assumed to be the in-house network environment of a franchise store of the convenience store chain. The intranet environment 201 includes an internal network system 5 that is connected to an open server 4 such as a World Wide Web (WWW) server via a firewall 6. The internal network system 5 is built on a client-server architecture in which a plurality of server computers 1 (hereinafter, "servers 1") and a plurality of client devices 3 are interconnected via a local network 2 such as a local area network (LAN). In the example shown in FIG. 1, the client devices 3 are assumed to be, although not limited to, printers. The firewall 6 monitors data packets that are communicated between the internal network system 5 and the external network 150 via the open server 4. From the security perspective of the internal network system 5, the firewall 6 determines whether to allow or to block the communication of each data packet based on predetermined conditions.

The intranet environment 301 has an identical configuration to the configuration of the intranet environment 201, except that the number of servers 1 or the number of client devices 3 is not necessarily same.

Meanwhile, instead of using the external network 150, a dedicated communication line can be used to connect the intranet environment 201 to the intranet environment 301.

Moreover, the local network 2 can be configured to be compatible to any one of wire communication, wireless infrared communication, wireless radio communication, optical fiber communication, and the like.

Figure 2:
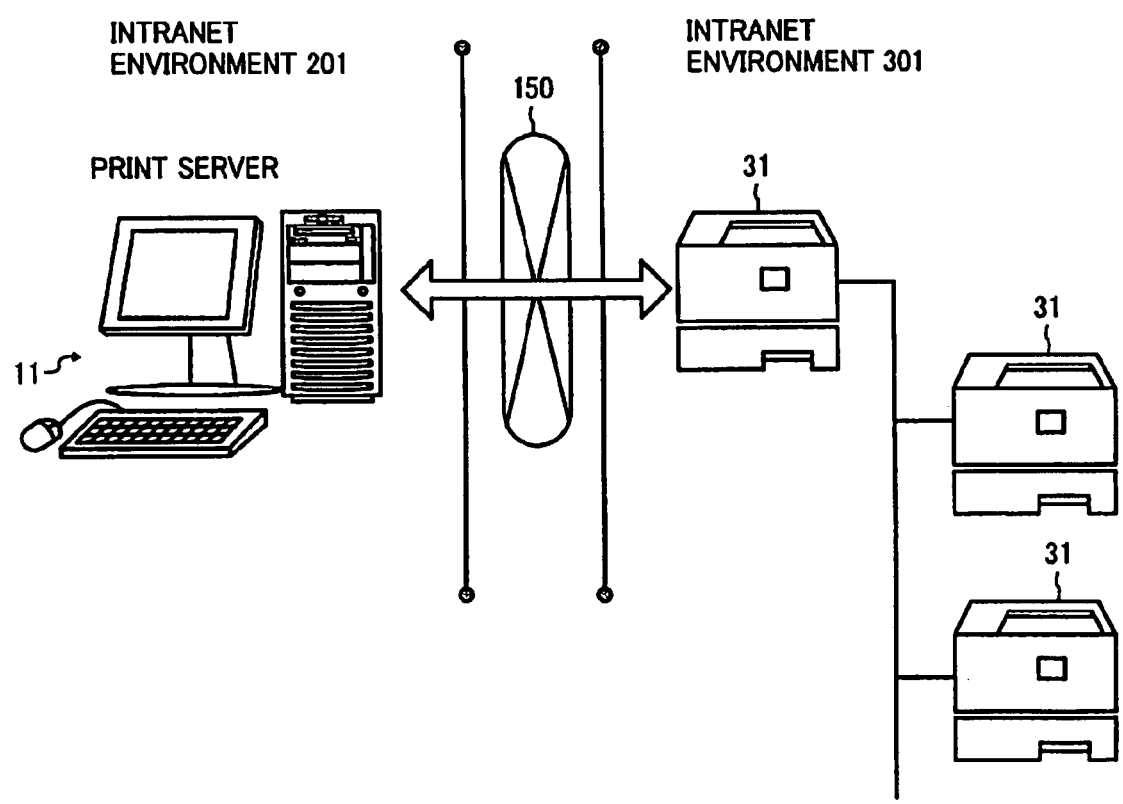
FIG. 2 is a schematic diagram for explaining an exemplary configuration of the network printing system.

In the network printing system 100, it is possible to carry out print jobs at a printer arranged in the intranet environment 301 by giving a printing instruction by using a server arranged in the intranet environment 201, and vice versa. For example, as shown in FIG. 2, a printing instruction can be sent to a uniquely-determined printer 31, which is one of a plurality of printers 31 arranged in the intranet environment 301, from a print server 11, which is one of the servers 1 arranged in the intranet environment 201.

Figure 3:
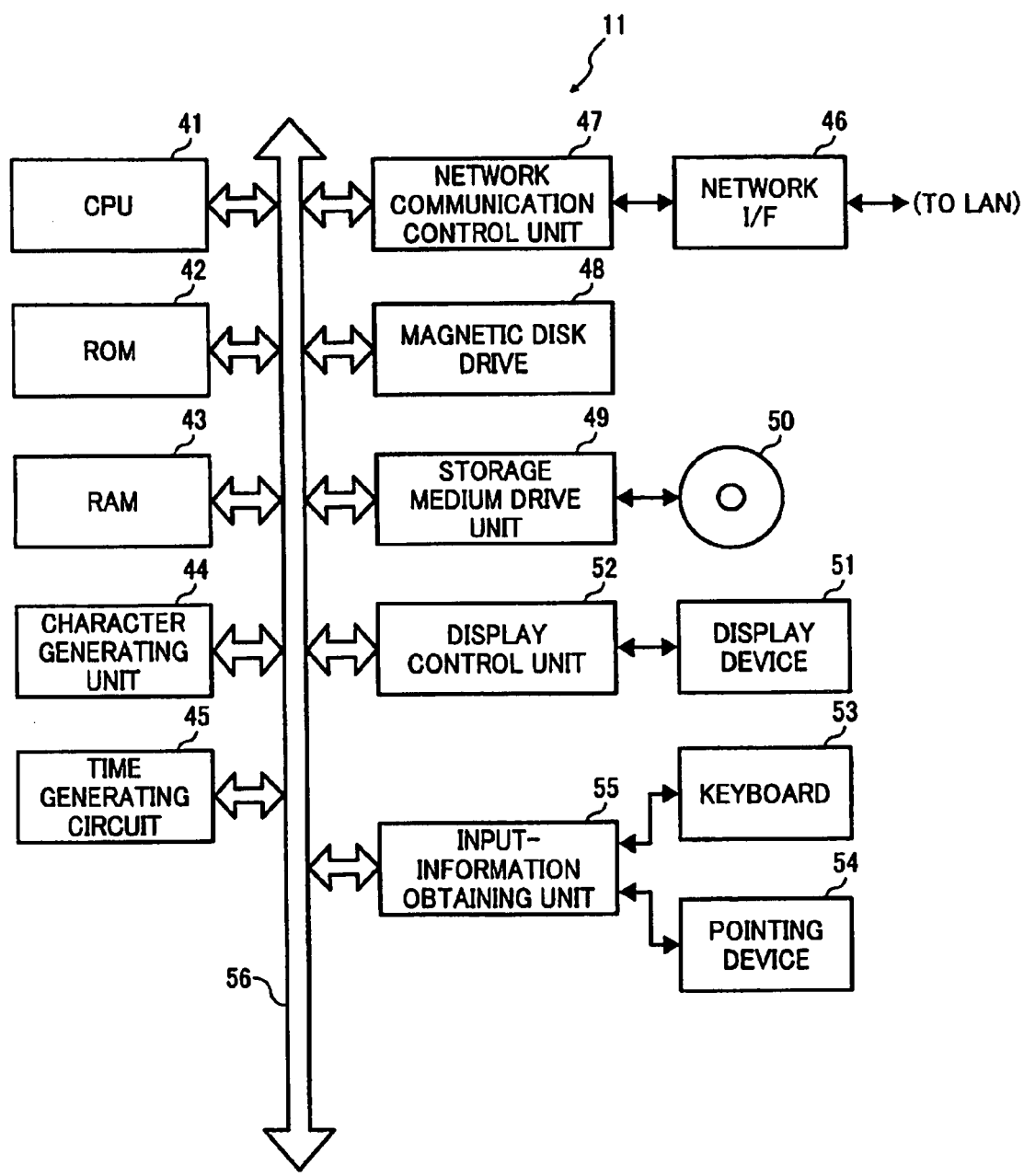
FIG. 3 is a block diagram for explaining an exemplary hardware configuration of a print server in the network printing system.

FIG. 3 is a block diagram for explaining an exemplary hardware configuration of the print server 11. The print server 11 includes a central processing unit (CPU) 41, a read only memory (ROM) 42, a random access memory (RAM) 43, a character generating unit 44, a time generating circuit 45, a network communication control unit 47, a magnetic disk drive 48, a storage medium drive unit 49, a display control unit 52, and an input-information obtaining unit 55. An internal bus 56 is used to interconnect the abovementioned hardware components. Moreover, a network interface (I/F) 46 is arranged to interface the print server 11 to the local network 2.

The CPU 41 controls the operations of the print server 11. The ROM 42 is used to store application programs and data necessary for booting the print server 11. The RAM 43 functions as a work area for the CPU 41. The character generating unit 44 generates graphic characters or display data. The time generating circuit 45 generates current time and date.

The network communication control unit 47 performs communication control processing of predetermined protocol suites. As a result, a variety of data can be communicated between the print server 11 and the servers 1 or the client devices 3 in any one of the intranet environments 201 and 301. For example, the print server 11 can send print data to the uniquely-determined printer 31 or receive the status of ongoing print jobs from the uniquely-determined printer 31.

The magnetic disk drive 48 is used to store a variety of application programs that run on an operating system (OS) of the print server 11 and a variety of data such as work data, file data, and image data. One of the application programs stored in the magnetic disk drive 48 is a print data transmission program that is executed to send print data to a printer. The storage medium drive unit 49 reads a compatible removable storage medium 50 and obtains a variety of application programs or data stored therein.

When the print server 11 is turned ON, the CPU 41 executes a loader routine stored in the ROM 42 and loads the OS from the magnetic disk drive 48 into the RAM 43. The OS manages the hardware components and the application programs in the print server 11. Subsequently, according to user instructions, various functions such as executing application programs, reading information, and storing information are performed. An application program can be a computer program that runs in the OS, or that performs partial execution of any of the processing functions described below, or that is included in a set of program files configuring an application software or the OS. Meanwhile, the removable storage medium 50 can be a compact disk read only memory (CD-ROM), a flexible disk (FD), a CD recordable (CD-R), a CD rewritable (CD-RW), a digital versatile disk (DVD), a semiconductor storage medium, and the like.

Generally, an application program is installed in the magnetic disk drive 48 from the removable storage medium 50. However, it is also possible to directly execute an application program from the removable storage medium 50. Moreover, it is also possible to download an application program via the network I/F 46 and install it in the magnetic disk drive 48.

The display control unit 52 controls the contents of an operation screen that is displayed on a display device 51 such as a cathode ray tube.

The input-information obtaining unit 55 obtains user instructions and information input from a keyboard 53 or a pointing device 54 such as a mouse.

In the print server 11, a specific application program is executed to generate printing document information. Meanwhile, the printing document information can also be obtained by using the removable storage medium 50 or obtained through the external network 150 in the form of an attachment to an electronic mail. The printing document information is stored in the magnetic disk drive 48.

Figure 4:
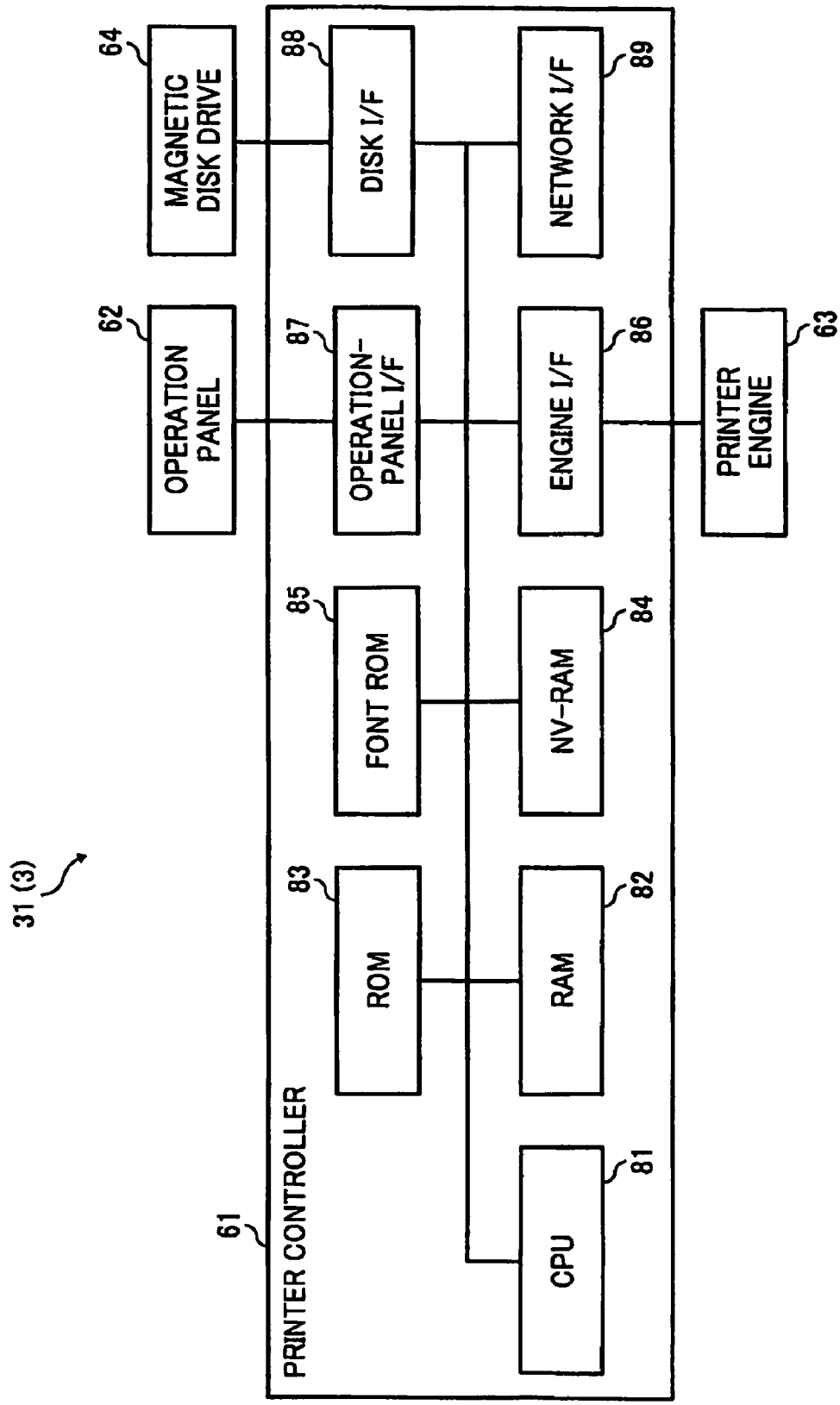
FIG. 4 is a block diagram for explaining an exemplary hardware configuration of a printer in the network printing system.

FIG. 4 is a block diagram for explaining an exemplary hardware configuration of an arbitrary one of the printers 31. The printer 31 includes a printer controller 61, an operation panel 62, a printer engine 63, and a magnetic disk drive 64. The printer controller 61 functions as a motherboard for managing the hardware components and the printing operations of the corresponding printer 31.

More particularly, based on the current print mode and a printer control code, which is included in an instruction received from a print server (e.g., the print server 11), the printer controller 61 converts print data into image data and outputs the image data to the printer engine 63. The printer controller 61 has a modular configuration that includes a CPU 81, a RAM 82, a ROM 83, a non volatile RAM (NV-RAM) 84, a font ROM 85, an engine I/F 86, an operation-panel I/F 87, a disk I/F 88, and a network I/F 89. The CPU 81 controls the functioning of the corresponding printer 31. The ROM 83 is used to store printer-specific information. The NV-RAM 84 is used to store information that needs to be retained even when power is turned OFF. The font ROM 85 is used to store a plurality of printing fonts. The engine I/F 86 interfaces the printer controller 61 to the printer engine 63. The operation-panel I/F 87 interfaces the printer controller 61 to the operation panel 62. The disk I/F 88 interfaces the printer controller 61 to the magnetic disk drive 64.

The RAM 82 functions as a work area for the CPU 81, and is provided with a data buffer area for temporarily storing received data and with an image buffer area for temporarily storing images.

The printer controller 61 sends a print control signal to the printer engine 63 via the engine I/F 86 and receives a print status signal from the printer engine 63 via the engine I/F 86.

The network I/F 89 interfaces the corresponding printer 31 to the local network 2 such that the printer 31 can communicate print control signals, print status signals, print data, and the like with the servers 1 in the intranet environment 201 or the intranet environment 301.

A user can use the operation panel 62 to set various print settings such as print status display setting, print mode setting, and printing condition setting.

The printer engine 63 forms an image by an electrophotographic process and prints the image on a recording medium such as a sheet of recording paper. More particularly, based on image data and print control information from the printer controller 61, the printer engine 63 forms an image on a photosensitive member (not shown) in an electrostatic manner and transfers the image on the recording medium.

The magnetic disk drive 64 is used to store printing document information, various information files, the OS, and a plurality of application programs executed in the OS. One of the application programs stored in the magnetic disk drive 64 is a print job program that is executed to carry out a print job.

When a printer 31 is turned ON, the CPU 81 loads the OS from the magnetic disk drive 64 into the RAM 82. The OS manages the hardware components and the application programs in the printer 31. Subsequently, according to user instructions, various functions such as executing application programs, reading information, and storing information are performed. An application program can be a computer program that runs in the OS, or that performs partial execution of any of the print processing functions described below, or that is included in a set of program files configuring an application software or the OS.

Generally, an application program is installed in the magnetic disk drive 64 from a removable storage medium (not shown). However, an application program can be directly executed from the removable storage medium. Moreover, it is also possible to download an application program via the network I/F 89 and install it in the magnetic disk drive 64.

Meanwhile, instead of the magnetic disk drive 64, it is also possible to use a computer-readable storage medium such as a semiconductor memory for storing various application programs and the OS.

Given below is the description of a substitutive printing process in which one or more lower level printers are kept ready to substitutively perform printing of print data in case a problem occurs in a higher level printer while printing that print data.

In the example shown in FIG. 2, when the uniquely-determined printer 31 receives print data from the print server 11, the printer controller 61 of the uniquely-determined printer 31 converts the print data into image data based on the print control information and outputs the image data to the printer engine 63. A print command is issued to the printer engine 63 to start printing the image data. However, during the printing process, there is a possibility that an error such as a paper-out condition, a paper jam condition, or a toner empty condition occurs in the uniquely-determined printer 31 thereby causing interruption in the printing process. Usually, when an error occurs, the printing process is interrupted and it resumes only after a user manually solves the problem. However, in the network printing system 100, the printing process can be prevented from interruption by instructing one of the other printers 31 in the intranet environment 301 (hereinafter, "lower level printers 31") to continue printing of the print data in place of the uniquely-determined printer 31. In the example shown in FIG. 2, two lower level printers 31 are arranged with respect to the uniquely-determined printer 31. Meanwhile, the uniquely-determined printer 31 is hereinafter referred to as the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

Similarly, one of the application programs stored in the magnetic disk drive 64 is the print job program. When the print job program is executed in the OS of the main printer 31, the CPU 81 controls the main printer 31 to print the print data transmitted by the print server 11.

Figure 5:
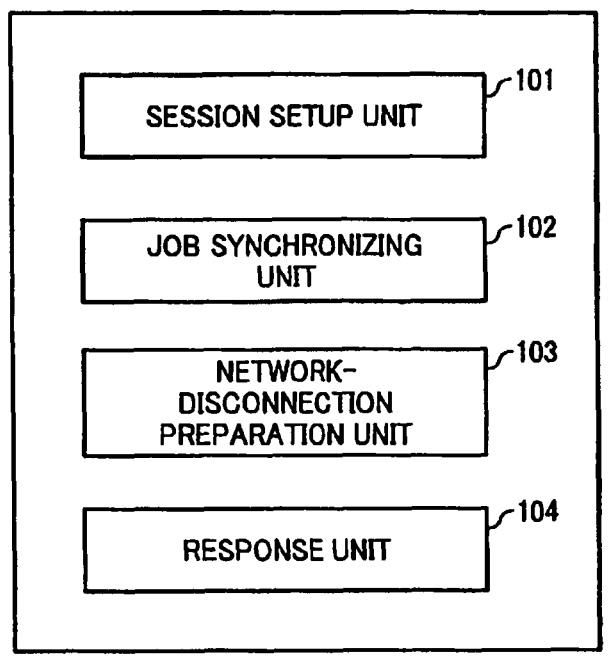
FIG. 5 is a block diagram for explaining a functional configuration of the printer implemented during a substitutive printing process.

FIG. 5 is a block diagram for explaining a functional configuration of an arbitrary one of the printers 31 implemented during the substitutive printing process. As shown in FIG. 5, the printer 31 includes a session setup unit 101, a job synchronizing unit 102, a network-disconnection preparation unit 103, and a response unit 104. The session setup unit 101 sets up a session with the print server 11 or with another printer 31 that is connected to the printer 31 under question (hereinafter, "self printer"). When the self printer 31 is performing the printing process to print the print job, which is received from the print server 11, including at least one piece of print data, the job synchronizing unit 102 maintains synchronization between the print job stored in the self printer 31 and the print job stored in another printer 31 that is in session with the self printer 31. The network-disconnection preparation unit 103 of the self printer 31 performs, when a network disconnection occurs, a process so as not to cancel the stored print job or close the session that has been setup by the session setup unit 101. The response unit 104 informs, when the network reconnection takes place after the network disconnection, the number of the pieces of the stored print data in response to an inquiry received from the print server 11.

Figure 6:
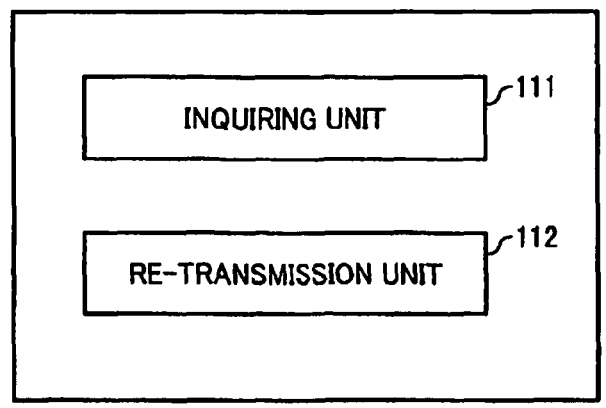
FIG. 6 is a block diagram for explaining a functional configuration of the print server implemented during the substitutive printing process.

FIG. 6 is a block diagram for explaining a functional configuration of the print server 11 for the substitutive printing process. As shown in FIG. 6, the print server 11 includes an inquiring unit 111 and a re-transmission unit 112. The inquiring unit 111 issues, when the network reconnection takes place after the network disconnection, an inquiry to the self printer server 31 about a status in which the network disconnection occurred. The re-transmission unit 112 transmits only those pieces of the print data that have not been received by the self printer 31 to the self printer 31 by referring to a response received from the self printer 31.

A series of processes in the substitutive printing process performed by the session setup unit 101 and the job synchronizing unit 102 is described below. The series of processes are described in details for each scene.

Figure 7:
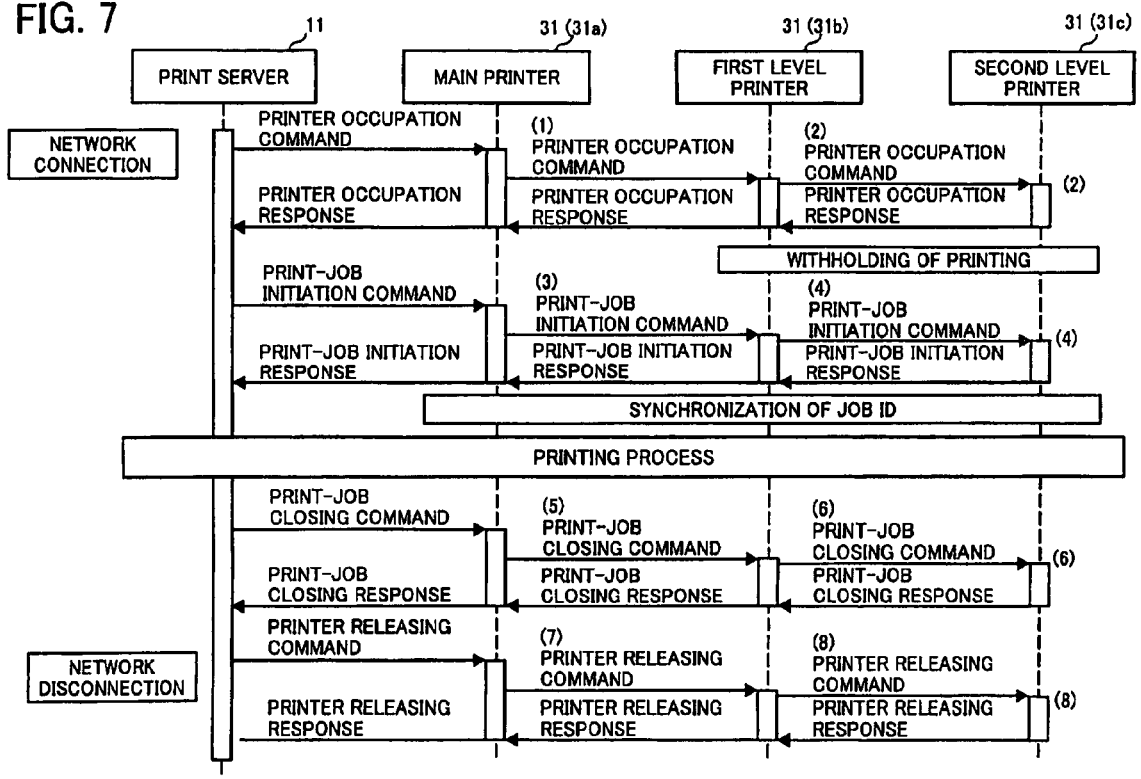
FIG. 7 is a sequence diagram of an exemplary network printing process in the network printing system.

FIG. 7 is a sequence diagram of an exemplary network printing process in the network printing system 100. In the example shown in FIG. 7, the intranet environment 301 includes a main printer 31*a*, a first level printer 31*b*, and a second level printer 31*c*. The main printer 31*a*, the first level printer 31*b*, and the second-level printer 31*c* all have the identical configuration as the printer 31 illustrated in FIGS. 4 and 5.

As described above, a main printer is uniquely determined by the print server 11. Thus, the main printer functions as the highest level printer and receives print data directly from the print server 11. All or some of the other printers that are connected to the main printer function as lower level printers. Meanwhile, the levels of the lower level printers can be maintained in a fixed order or can be varied for each print job. For example, it is possible to store in each printer the internet protocol (IP) address of an immediate lower level printer to which print data or various commands are to be forwarded. In the example shown in FIG. 7, the second level printer 31*c* is configured as the immediate lower level printer with respect to the first level printer 31*b*, while the first level printer 31*b* is configured as the immediate lower level printer with respect to the main printer 31*a*.

In the network printing process, after the session setup unit 101 sets up the sessions with the print server 11 and with another printer 31 that is connected to the self printer 31 via the network, a printer occupation process is performed.

The network printing process described with reference to FIG. 7 is performed in the following sequence:

(1) The print server 11 issues a printer occupation command to the main printer 31a. As a result, the main printer 31a functions as a dedicated printer to carry out print jobs instructed only by the print server 11. The main printer 31a then forwards the printer occupation command to the first level printer 31b. As a result, the first level printer 31b also functions as a dedicated printer to carry out print jobs instructed by the print server 11. In addition to that, the main printer 31a issues a withhold command to the first level printer 31b. The withhold command instructs the first level printer 31b to withhold printing.

Figure 8:
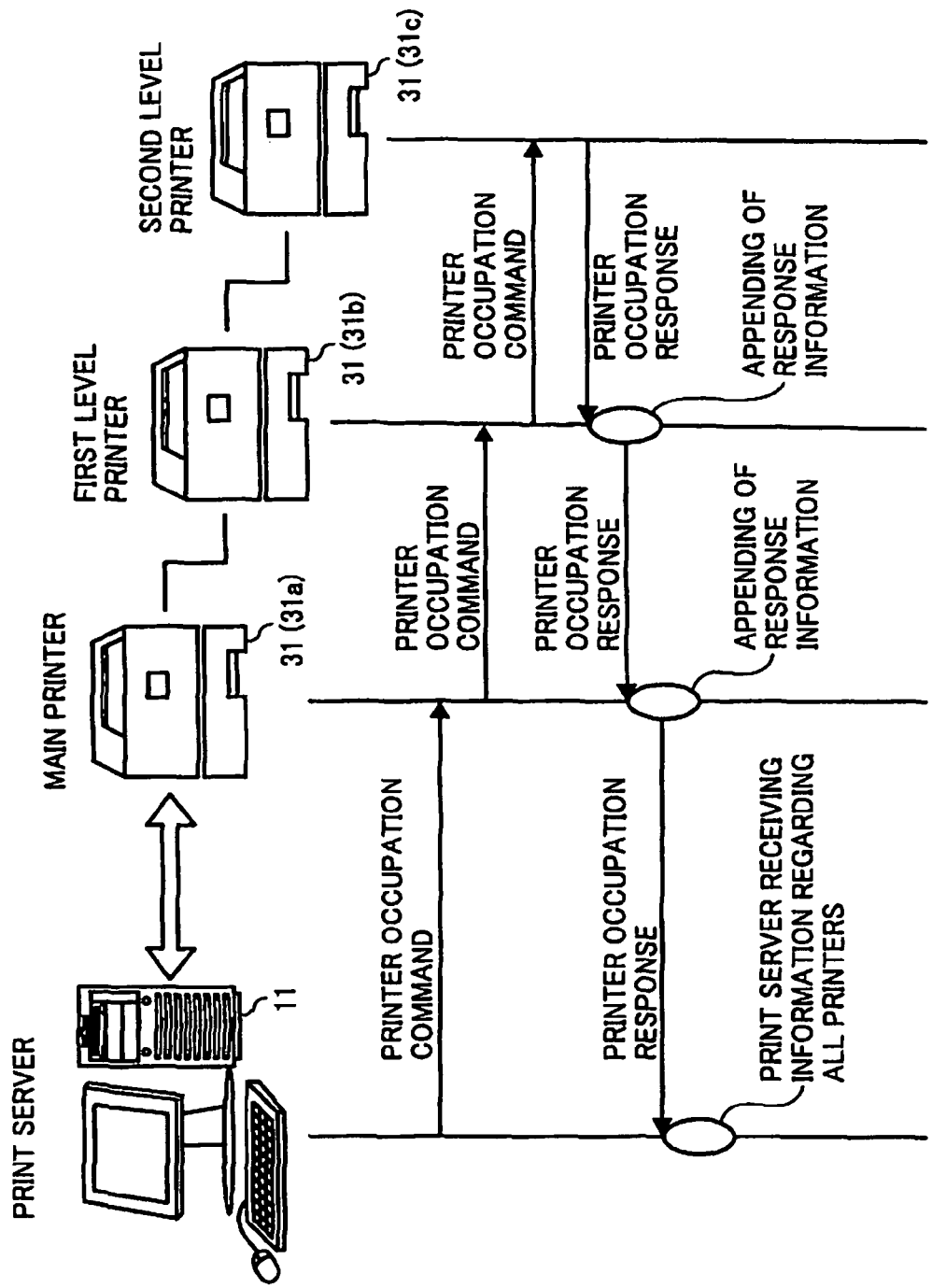
FIG. 8 is a sequence diagram of sequential appending of response information in the network printing system.

(2) Subsequently, the first level printer 31b forwards the printer occupation command to the second level printer 31c, while the first level printer 31b issues a withhold command to the second level printer 31c. Because no immediate lower level printer is arranged with respect to the second level printer 31c, it sends back a response corresponding to the printer occupation command (hereinafter, "printer occupation response") to the first level printer 31b. The printer occupation response includes response information (e.g., IP address) of the second level printer 31c. The first level printer 31b appends the response information received from the second level printer 31c to response information of its own (see FIG. 8), and sends the resultant response information to the main printer 31a. The main printer 31a then appends the response information received from the first level printer 31b to response information of its own (see FIG. 8), and sends the resultant response information to the print server 11.

In this way, the print server 11 receives up-to-date response information from all the dedicated printers and keeps a log of the response information.

Meanwhile, as described above, the main printer 31a communicates information with the print server 11 via the external network 150 and the firewall 6. For that, either the firewall 6 can be configured to allow the communication of information or the information can be communicated in the form of an attachment to an electronic mail.

(3) The print server 11 then issues a print-job initiating command to the main printer 31a. In response, the main printer 31a performs a-print-job initiating process and forwards the print-job initiating command to the first level printer 31b along with a job ID of the initiated print job.

(4) The first level printer 31b performs a print-job initiating process by using the received job ID. Performing a print-job initiating process by using the same job ID leads to synchronization of the print-job initiating process in the main printer 31a and the first level printer 31b. Subsequently, the first level printer 31b then forwards the print-job initiating command to the second level printer 31c along with the same job ID. The second level printer 31c performs a print-job initiating process by using the received job ID. Thus, the print-job initiating process is maintained in synchronization in the main printer 31a, the first level printer 31b, and the second level printer 31c. Because no immediate lower level printer is arranged with respect to the second level printer 31c, it sends back a response corresponding to the print-job initiating command (hereinafter, "print-job initiating response") to the first level printer 31b, which in turn sends a print-job initiating response to the main printer 31a. Eventually, the main printer 31a sends a print-job initiating response to the print server 11.

Subsequently, the main printer 31a prints the print data in the initiated print job.

Figure 9:
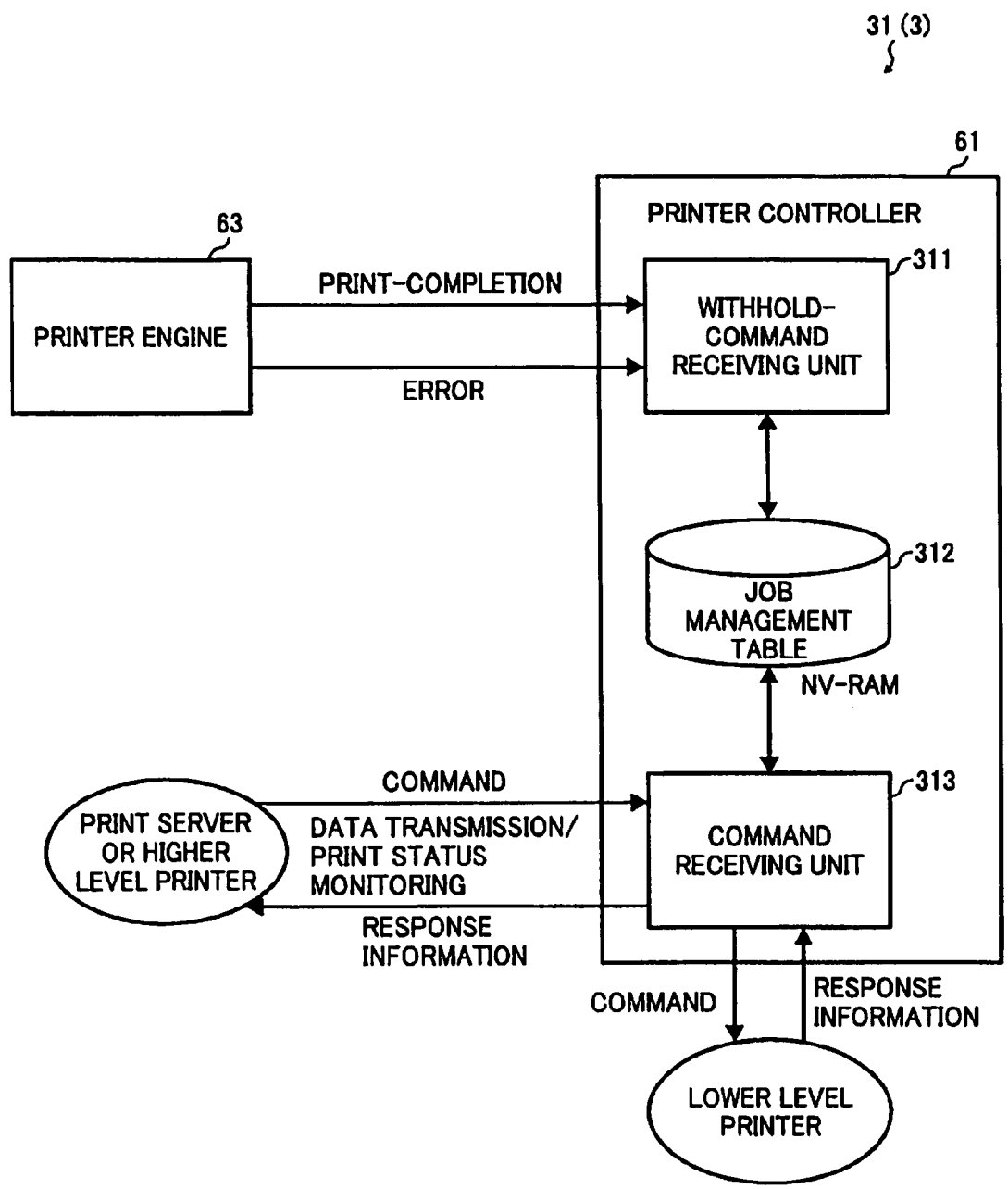
FIG. 9 is a schematic diagram for explaining a functional configuration of a job synchronization process in the substitutive printing process.

FIG. 9 is a schematic diagram for explaining a functional configuration of the job synchronization process in the substitutive printing process performed by an arbitrary one of the printers 31. As shown in FIG. 9, the printer 31 includes, as units related to the job synchronization process, a withhold-command receiving unit 311, a job management table 312 stored in the NV-RAM 84, and a command receiving unit 313.

The withhold-command receiving unit 311 receives a print-completion notice from the printer engine 63. The printer controller 61 reads the job management table 312, counts the total number of printed pages assigned to the same job ID, and stores the total number of printed pages in the job management table 312. On the other hand, upon receiving an error notice from the printer engine 63, the withhold-command receiving unit 311 stores an error code related to the error notice in the job management table 312.

The command receiving unit 313 receives a command (data transmission command or status monitoring command) from the print server 11 (server 1) or the higher level printer 31, and transmits the received command to the lower level printer (sub-printer) 31. Upon receiving the response information corresponding to the status monitoring command from the lower level printer (sub-printer) 31, the command receiving unit 313 reads the job management table 312, and appends the page information (including the total number of printed pages) extracted from the received response information to the page information of its own. If the command receiving unit 313 receives the response information corresponding to the status monitoring command from the lower level printer (sub-printer) 31 and finds error code or error information in the received response information, the command receiving unit 313 appends the error information to the response information of its own. After that, the command receiving unit 313 transmits the response information acquired from the job management table 312 to the print server 11 (server 1) or the higher level printer 31.

The printing process when no error occurs is described with reference to FIG. 10 in the following sequence:

(11) The print server 11 issues a print data transmission command to the main printer 31a. The main printer 31a forwards the print data transmission command to the first level printer 31b.

(12) Subsequently, the first level printer 31b forwards the print data transmission command to the second level printer 31c. Because no immediate lower level printer is arranged with respect to the second level printer 31c, it sends back a response corresponding to the data transmission command (hereinafter, "print data transmission response") to the first level printer 31b and performs print data processing of the initiated print job. Eventually, the first level printer 31b sends a print data transmission response to the main printer 31a, which in turn sends a print data transmission response to the print server 11. Then, the main printer 31a performs print data processing of the initiated print job and prints the print data in the initiated print job.

(13) For each printed and discharged page of the print data, the main printer 31a issues a print data deleting command to the first level printer 31b. Consequently, the first level printer 31b deletes the print data corresponding to the discharged page. Subsequently, the first level printer 31b forwards the print data deleting command to the second level printer 31c. Consequently, the second level printer 31c also deletes the print data corresponding to the discharged page of the print data. In this way, the deleted data corresponding to the discharged pages is maintained in synchronization in the main printer 31a, the first level printer 31b, and the second level printer 31c.

(14) The print server 11 issues a print status monitoring command to the main printer 31a. The main printer 31a then forwards the print status monitoring command to the first level printer 31b.

(15) In turn, the first level printer 31b forwards the print status monitoring command to the second level printer 31c. Because no immediate lower level printer is arranged with respect to the second level printer 31c, it sends back a print status monitoring response to the first level printer 31b, which in turn sends a print status monitoring response to the main printer 31a.

Figure 11:
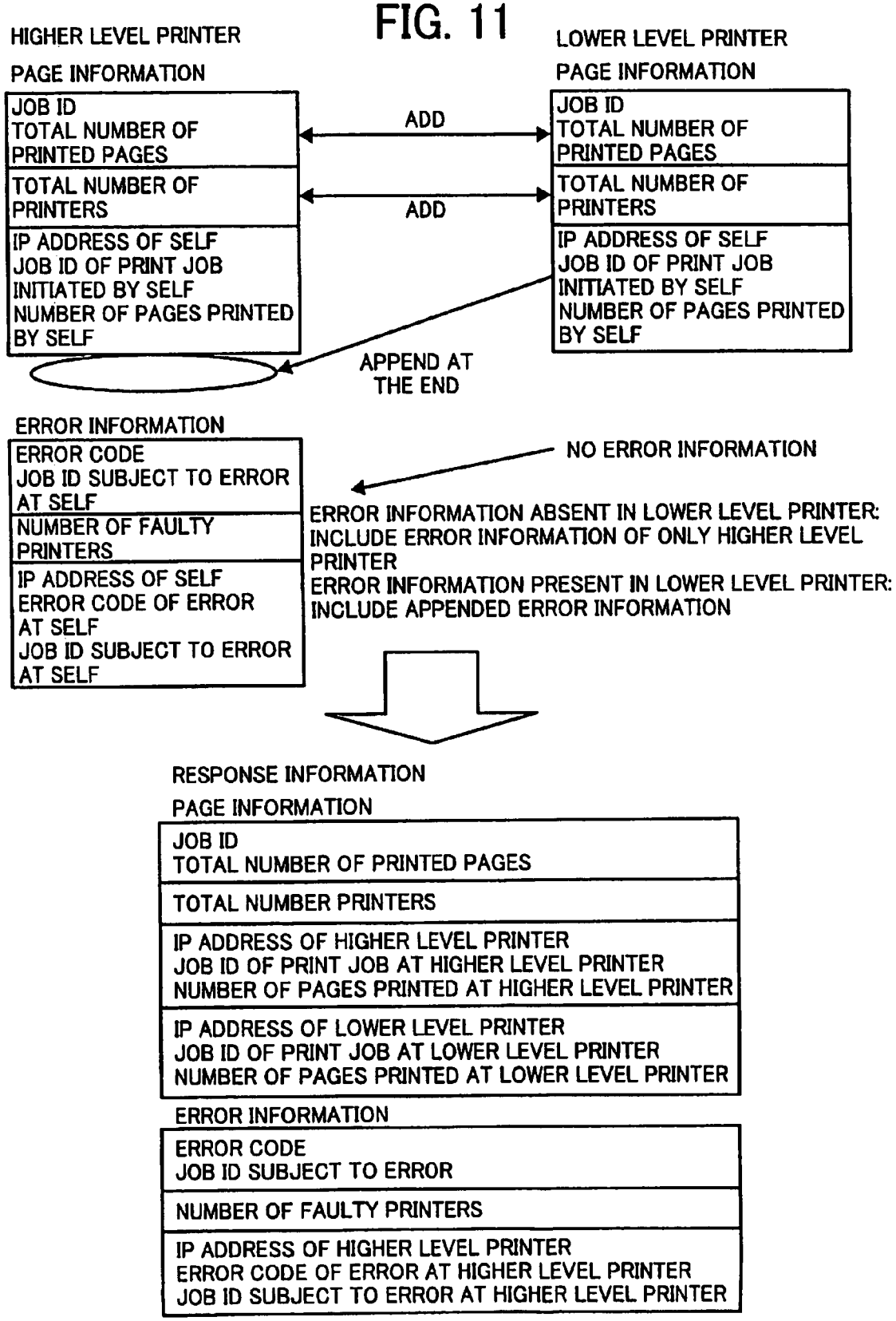
FIG. 11 is a diagram for explaining exemplary appending of response information.

As shown in FIG. 11, a higher level printer, which can be a main printer, appends page information of a corresponding lower level printer to page information of its own to generate appended page information. The page information of each printer includes the total number of printed pages for the initiated print job, the total number of printers, and the printer information (e.g., IP address, job ID of initiated print job, number of printed pages) of each printer. A higher level printer, first, receives the page information from the corresponding immediate lower level printer. Then, the higher level printer appends the received page information to the page information of its own, and sends the appended page information to the corresponding immediate higher level printer.

Along with the page information, the higher level printer appends error information of the corresponding lower level printer to error information of its own to generate appended error information. The error information of each printer includes an error code for the interrupted print job, the number of printers in which the print job was interrupted due to an error, and its own printer information. In the example shown in FIG. 11, error information is not generated in the lower level printer because no error occurs therein.

Figure 10:
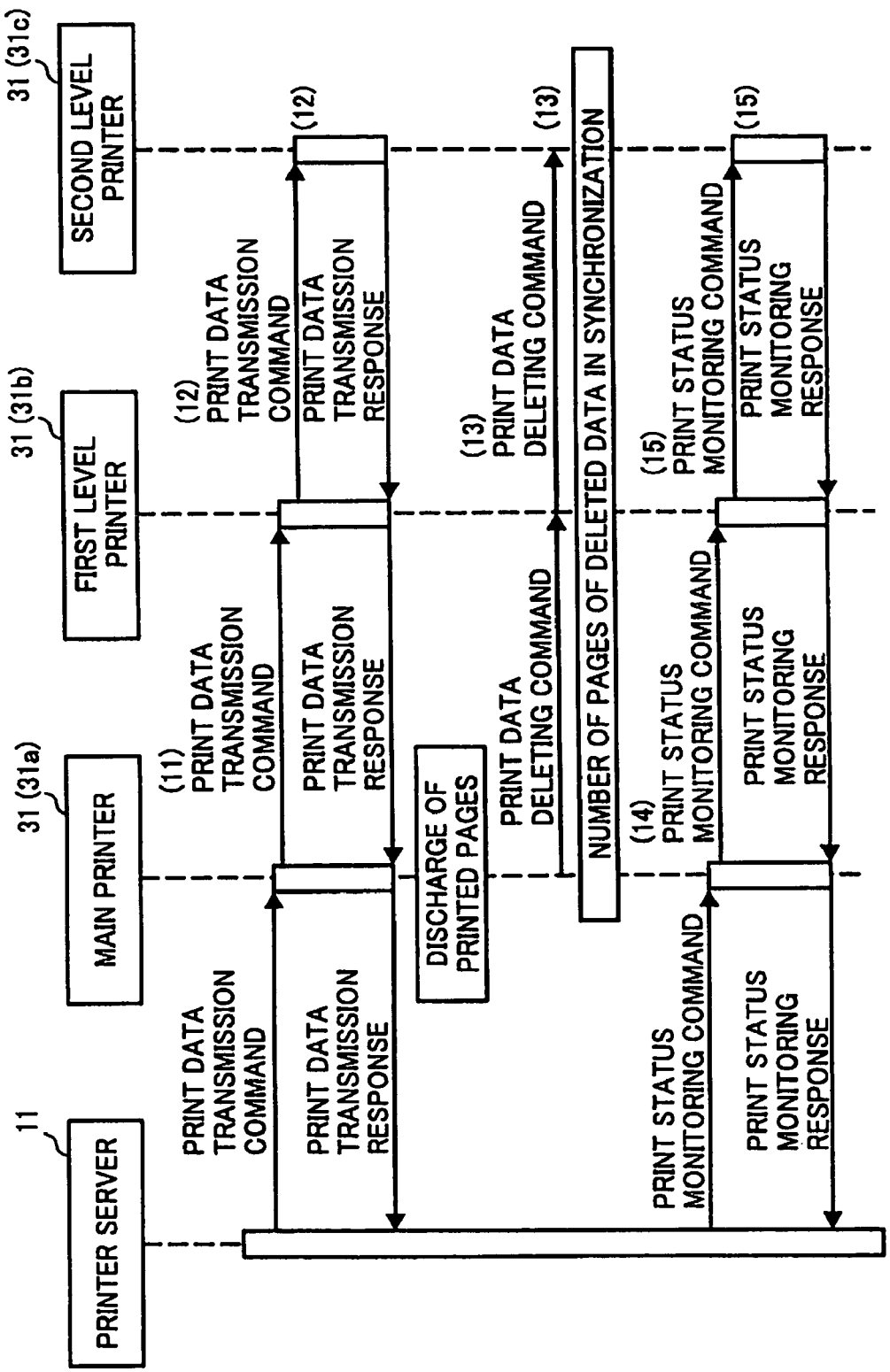
FIG. 10 is a sequence diagram of an exemplary printing process when no error occurs in a main printer.

As shown in FIG. 10, upon generating the appended page information and the appended error information, the main printer 31a sends a print status monitoring response to the print server 11. The print status monitoring response includes the appended page information and the appended error information. Subsequently, the printing process is completed unless an error occurs in the main printer 31a.

Because of the print status monitoring response, the print server 11 is able to obtain the information regarding the total number of printed pages of the initiated print job and the print status of each of the main printer 31a, the first level printer 31b, and the second level printer 31c. The print server 11 keeps a log of the information obtained from the print status monitoring response. Meanwhile, in the example shown in FIG. 10, the print data is printed in entirety by the main printer 31a. Thus, the total number of printed pages notified to the print server 11 is equal to the number of pages printed by the main printer 31a.

FIG. 12 is a diagram for explaining an exemplary page information table T1 maintained in the RAM 43 of the print server 11. The page information table T1 is used to store the appended page information obtained from the print status monitoring response of the main printer 31a. The page information table T1 includes three portions, namely, a, b, and c. In the portion a, basic information such as the job ID of each initiated print job and the number of printed pages for the initiated print job is stored. In the portion b, the total number of printers that sent the response information is stored. In the portion c, the printer information of each printer (e.g., the IP address, job ID of initiated print job, number of printed pages) is stored. Meanwhile, as described above, the job ID of the print job initiated by each printer is identical.

FIG. 13 is a diagram for explaining an exemplary error information table T2 maintained in the RAM 43 of the print server 11. The error information table T2 is used to store the appended error information obtained from the print status monitoring response of the main printer 31a. The error information table T2 includes three portions, namely, d, e, and f. In the portion d, information such as the error code for each interrupted print job and the printers at which the print job was interrupted is stored. In the portion e, the number of printers at which the print job was interrupted is stored. In the portion f, the printer information each printer (e.g., IP address, job ID of the interrupted print job, and number of printed pages for the interrupted print job) at which the print job was interrupted is stored. Meanwhile, as described above, the job ID of the print job interrupted in any of the printers is identical.

FIG. 14 is a sequence diagram of an exemplary substitutive printing process when an error occurs in the main printer 31a while printing the print data. The substitutive printing process can be performed when a plurality of printers is connected via a LAN by using a linear topology, a star topology, a ring topology, and the like. In such a configuration, it is possible to substitutively perform printing of print data in a substitute printer in case a problem occurs in the current printer while printing that print data.

The substitutive printing process described with reference to FIG. 14 is performed in the following sequence:

(16) If an error (e.g., paper-out condition) occurs in the main printer 31a while printing the print data, the main printer 31a issues a print authorizing command to the first level printer 31b. The main printer 31a then aborts printing of the print data and withholds printing thereafter.

(17) Upon receiving the print authorizing command from the main printer 31a, the first level printer 31b cancels the withhold command that it had received earlier from the main printer 31a. As a result, the first level printer 31b can substitutively start to print the print data in place of the main printer 31a.

(18) For each printed and discharged page of the print job, the first level printer 31b issues a print data deleting command to each of the main printer 31a and the second level printer 31c. Consequently, each of the main printer 31a and the second level printer 31c deletes the print data corresponding to the discharged page.

(19) The print server 11 issues the print status monitoring command to the main printer 31a. The main printer 31a then forwards the print status monitoring command to the first level printer 31b.

(20) In turn, the first level printer 31b forwards the print status monitoring command to the second level printer 31c. Because no immediate lower level printer is arranged with respect to the second level printer 31c, it sends back a print status monitoring response to the first level printer 31b, which in turn sends a print status monitoring response to the main printer 31a. Eventually, the main printer 31a sends a print status monitoring response to the print server 11. The print status monitoring response includes the page information and the error information of each of the main printer 31a, the first level printer 31b, and the second level printer 31c. As a result, the print server 11 is able to obtain the information regarding the total number of printed pages and the print status of each of the main printer 31a, the first level printer 31b, and the second level printer 31c. The print server 11 keeps a log of the information obtained from the print status monitoring response of the main printer 31a. Meanwhile, in the example shown in FIG. 14, the print data is printed first by the main printer 31a and then by the first level printer 31b. Thus, the total number of printed pages notified to the print server 11 is equal to the sum of the number of pages printed by the main printer 31a and the number of pages printed by the first level printer 31b.

Figure 15:
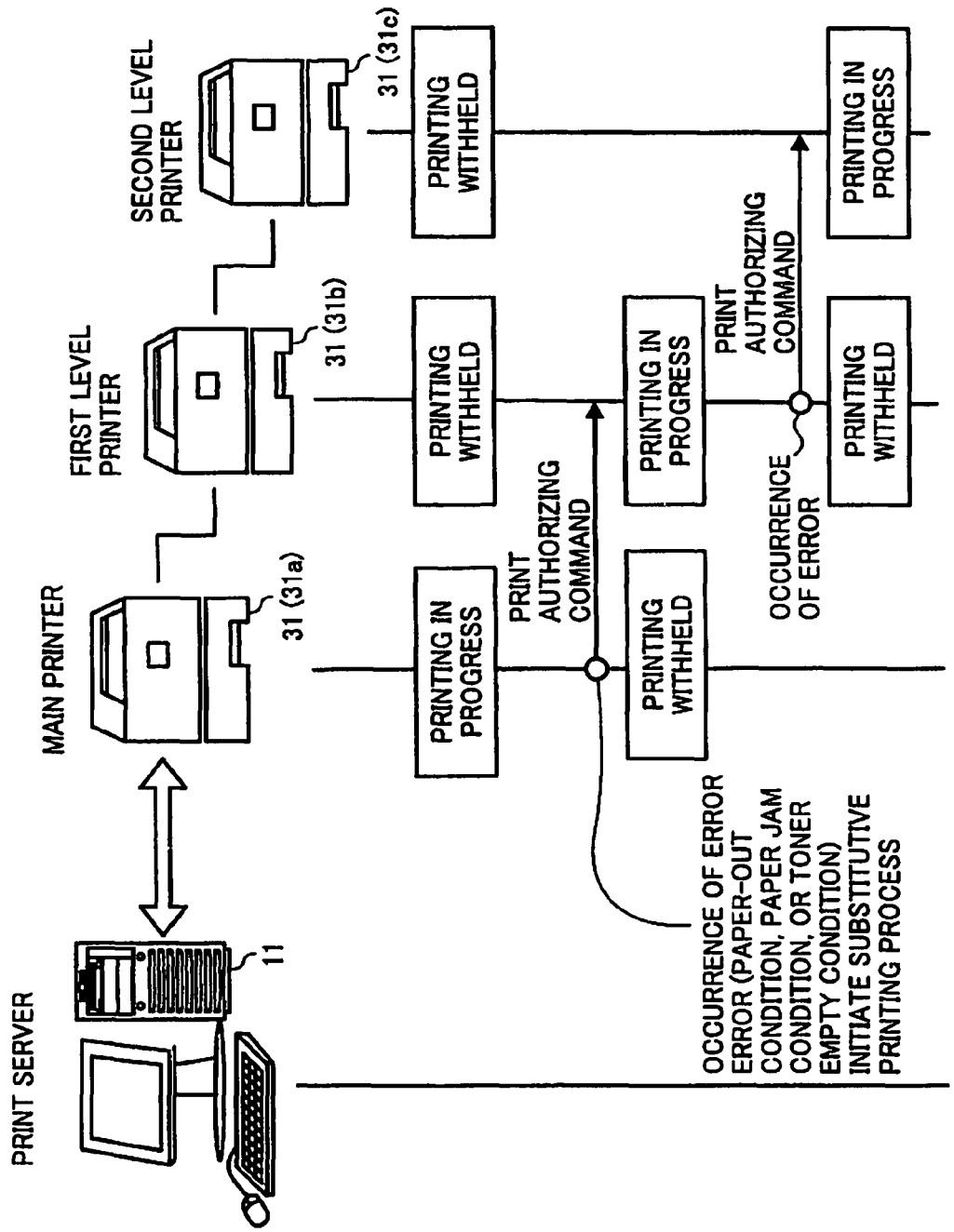
FIG. 15 is a sequence diagram of an exemplary substitutive printing process when an error occurs in more than one printer while printing print data.

In this way, even if an error occurs in the main printer 31a while printing the print data, the error information is not immediately notified to the print server 11. Instead, the first level printer 31b is instructed to substitutively continue the printing process. Similarly, even if an error occurs in the first level printer 31b while printing the print data, the second level printer 31c is instructed to substitutively continue the printing without immediately notifying the error information to the print server 11 (see FIG. 15).

When an error occurs only in the main printer 31a, the appended error information notified to the print server 11 includes the error information only of the main printer 31a. If the first level printer 31b successfully prints the remaining print data, then no error information is generated therein.

Figure 16:
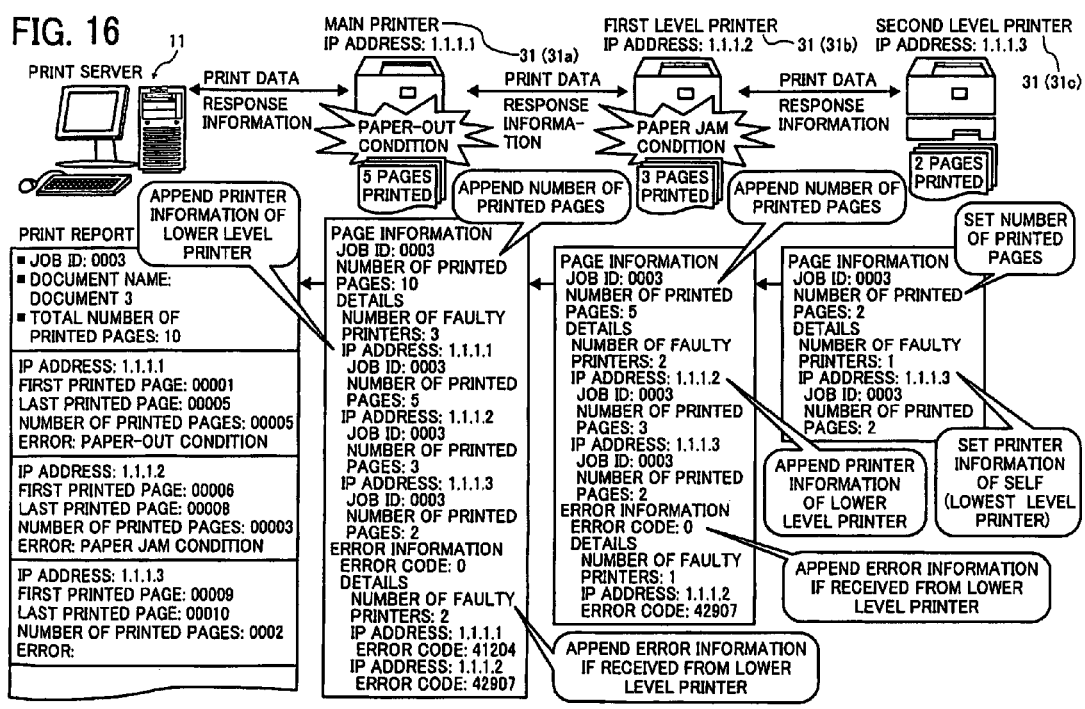
FIG. 16 is a diagram for explaining an exemplary substitutive printing process when an error occurs in more than one printer while printing print data.

FIG. 16 is a diagram for explaining an exemplary substitutive printing process when an error occurs in each of the main printer 31a and the first level printer 31b while printing the print data. In the example shown in FIG. 16, it is assumed that the print server 11 instructs the main printer 31a to print 10 pages of print data. It is assumed that the main printer 31a prints the first five pages and an error occurs in the main printer 31a. Moreover, it is assumed that the first level printer 31b prints the subsequent three pages and an error occurs in the first level printer 31b. Finally, it is assumed that the second level printer 31c successfully prints the last two pages such that the printing process is complete. In this case, the appended error information notified to the print server 11 includes the error information of the main printer 31a and the first level printer 31b.

When the print server 11 receives the print status monitoring response from the main printer 31a, it is able to obtain the information regarding the number of printed pages at each of the main printer 31a, the first level printer 31b, and the second level printer 31c as well as the error information of the main printer 31a and the first level printer 31b.

Upon completion of each printing process, the print server 11 releases the main printer 31a, the first level printer 31b, and the second level printer 31c from the dedicated status in the following sequence with reference to FIG. 7:

(5) First, the print server 11 issues a print-job closing command to the main printer 31a. Consequently, the main printer 31a closes the initiated print job and forwards the print-job closing command to the first level printer 31b.

(6) Subsequently, the first level printer 31b closes the initiated print job and forwards the print-job closing command to the second level printer 31c. Because no immediate lower level printer is arranged with respect to the second level printer 31c, it sends back a response corresponding to the print-job closing command (hereinafter, "print-job closing response") to the first level printer 31b, which in turn sends a print-job closing response to the main printer 31a. Eventually, the main printer 31a sends a print-job closing response to the print server 11 indicating that each of the main printer 31a, the first level printer 31b, and the second level printer 31c has closed the initiated print job.

(7) The print server 11 then issues a printer releasing command to the main printer 31a such that the main printer 31a is released from the dedicated status with respect to the print server 11. The main printer 31a then forwards the printer releasing command to the first level printer 31b.

(8) Consequently, the first level printer 31b is released from the dedicated status with respect to the print server 11. The first level printer 31b then forwards the printer releasing command to the second level printer 31c. Because no immediate lower level printer is arranged with respect to the second level printer 31c, it sends back a response corresponding to the printer releasing command (hereinafter, "printer releasing response") to the first level printer 31b, which in turn sends a printer releasing response to the main printer 31a. Eventually, the main printer 31a sends a printer releasing response to the print server 11 indicating that each of the main printer 31a, the first level printer 31b, and the second level printer 31c is released from the dedicated status with respect to the print server 11.

In this manner, the job synchronizing unit 102 maintains the synchronization between the print job stored in the self printer 31 and the print job stored in the other printers 31 in session with the self printer 31.

Figure 17:
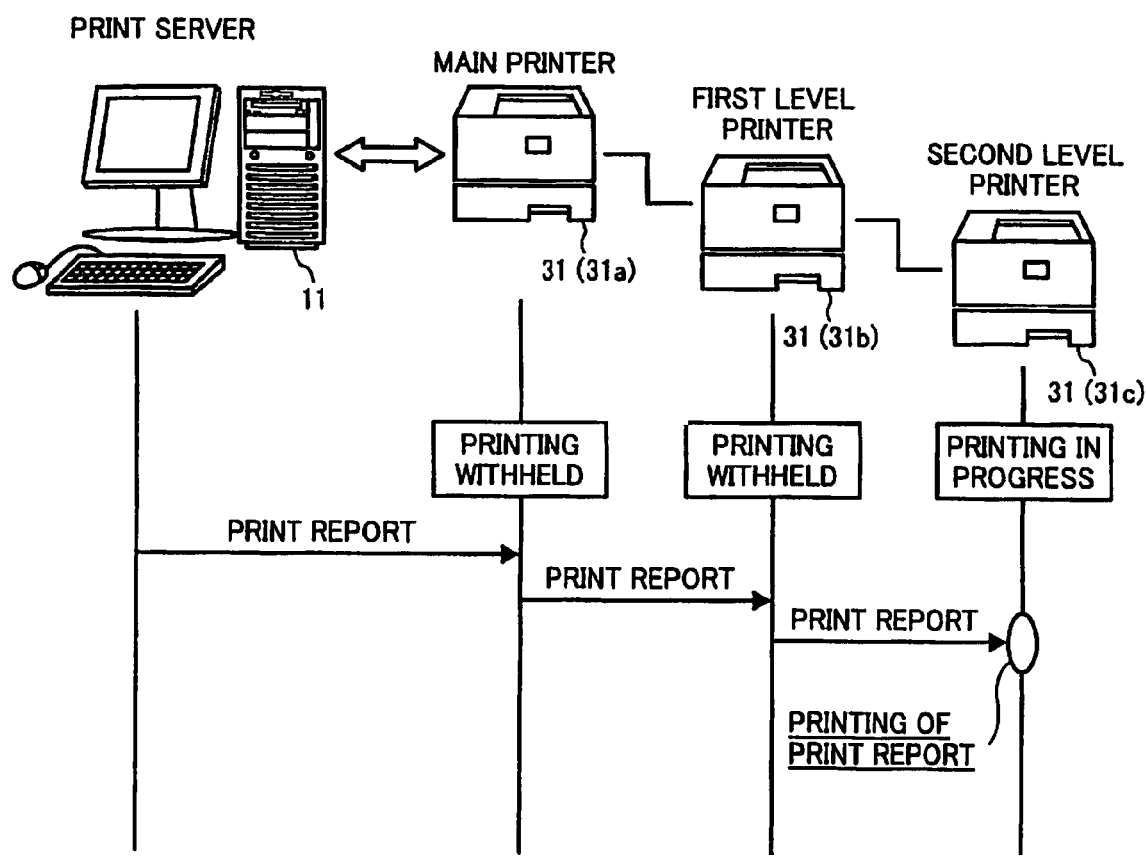
FIG. 17 is a sequence diagram of an exemplary print report generating process performed after completion of the substitutive printing process.

FIG. 17 is a sequence diagram of an exemplary print report generating process performed after completion of the substitutive printing process described with reference to FIG. 16. The print server 11 generates a print report based on the page information table T1 and the error information table T2. Subsequently, the print server 11 sends the print report to the main printer 31a.

The print report is then sequentially forwarded to the first level printer 31b and the second level printer 31c. The second level printer 31c is instructed, as the last printer to perform substitutive printing, to print the print report.

FIG. 18 is a diagram of an exemplary print report generated during the print report generating process. The print report includes the job ID of the initiated print job, a document name of the initiated print job, and the total number of printed pages of the initiated print job. The print report also includes the printer information of each of the main printer 31a, the first level printer 31b, and the second level printer 31c. The printer information of each printer includes the IP address, the page number of the first printed page, the page number of the last printed page, the total number of pages printed, and error information. By circulating the print report to each of the main printer 31a, the first level printer 31b, and the second level printer 31c, it becomes possible to crosscheck whether the substitutive printing process is performed properly. Moreover, by instructing the second level printer 31c to print the print report, it becomes possible for the user to confirm the number of pages printed at each of the main printer 31a, the first level printer 31b, and the second level printer 31c by.

The printing process when the network disconnection occurs is described below.

In the conventional technology, data is transmitted from a higher level device to a lower level device in a one-way manner. The conventional host apparatus, which is the higher level device, cannot recognize how much print data the printer, which is the lower level device, has received among the total print data the host apparatus sent to the printer. Therefore, after the network reconnection takes place, the conventional host apparatus cannot transmit only an un-received part of the print data to the printer, i.e., the conventional host apparatus must transmit the entire print data including the received part to the printer.

However, in the network printing system 100, as described above, a higher level device, i.e., the host apparatus can both transmit and receive data to and from a lower level device, the printer, in the form of commands and responses. Therefore, the host apparatus can recognize how much print data the printer has received when a network disconnection occurs. More particularly, the printer stores therein the total number of pieces of the print data received from the host apparatus at the end of the reception. When the network reconnection takes place after the network disconnection, the printer transmits the total number of the received pieces of the print data in response to a request received from the host apparatus. The host apparatus then transmits only the un-received pieces of the print data.

Figure 19:
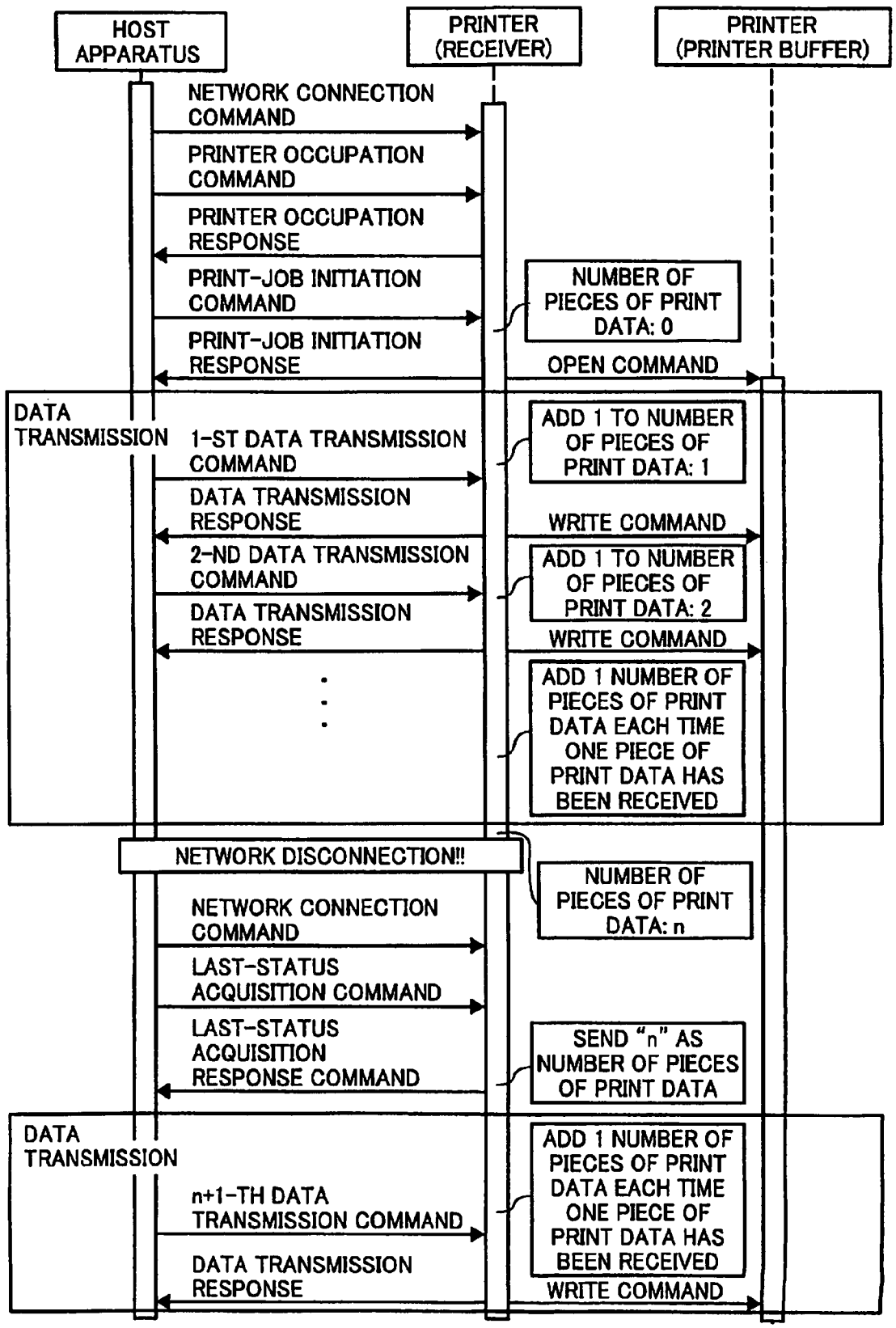
FIG. 19 is a sequence diagram for explaining an exemplary printing process when a network disconnection occurs.

FIG. 19 is a sequence diagram for explaining an exemplary printing process when a network disconnection occurs. To make the description simpler, only the host apparatus and the printers are shown in FIG. 19. The host apparatus can be any of the print server 11, the main printer 31a, and the first level printer 31b.

Upon receiving the printer occupation command from the host apparatus, the printer performs the printer occupation process and then sends the printer occupation response to the host apparatus.

Upon receiving the print-job initiating command from the host apparatus, the printer sends the print-job initiating response to the host apparatus. In the print-job initiating process, the printer opens the printer buffer and sets the total number of the pieces of the print data to zero.

Subsequently, the printing process is performed.

Upon receiving the data transmission command from the host apparatus, the printer sends the data transmission response to the host apparatus and then starts the print-data process. In the print-data process as shown in FIG. 19, the printer adds one to the total number of the received pieces of the print data each time when the printer completes receiving of one piece, and writes the received piece of the print data in the printer buffer. The printer receives the data transmission command several times until the printer receives all pieces of the print data.

In the example shown in FIG. 19, a network disconnection occurs before the printer receives all the pieces of the print data (e.g., when the printer completes receiving of an n-th piece of the print data). In case of the network disconnection, the network-disconnection preparation unit 103 maintains the stand-by status and waits for the print data without cancelling the print job stored in the printer buffer or closing the printer buffer. The relation among the action to which the print job is to be subjected, the timing when the network disconnection occurs, and information about a status in which the network disconnection occurred (hereinafter, "last status") is shown in the following table. The last status is to be sent from the printer to the host apparatus when the network reconnection takes place.

| Last command before disconnection | Cancellation/non-cancellation of the print job at disconnection | Last status to be sent at reconnection |
| --- | --- | --- |
| Printer occupation command | Cancel the print job | No data is sent |
| Print-job initiating command | Cancel the print job | No data is sent |
| Data transmission command (in the middle of receiving 1-st data) | Cancel the print job | No data is sent |
| Data transmission command (after completion of receiving n-th data) | Do not cancel the print job | Data transmission (n-th data) |
| Data transmission command (in the middle of receiving n-th data) | Do not cancel the print job | Data transmission (n-1-th data) |
| Data transmission command (at the end of receiving all data) | Do not cancel the print job | Data transmission (n-th data) |
| Print-job closing command | Do not cancel the print job | Print-job closing |
| Printer releasing command | Cancel the print job | No data is sent |

As shown in the above table, if a network disconnection occurs as following timing:
Data transmission (after completion of receiving n-th data, where n>1),
Data transmission (in the middle of receiving n-th data),
Data transmission (after completion of receiving all data), and
Job closing,
the print job is maintained without being cancelled. On the other hand, if a network disconnection occurs as following timing:
Printer occupation,
Job initiation,
Data transmission (in the middle of receiving 1-st data), and
Printer release,
the print job is cancelled.

When the network disconnection occurs, the printer starts a timer and waits for the network reconnection for a time-out period. While the printer waits for the network reconnection, the printer is in the occupation state. If the printer is in the occupation state for a long period, the operating rate of the printer remarkably decreases. To prevent the low operating rate, the printer does not wait for the network reconnection over the time-out period.

Figure 20:
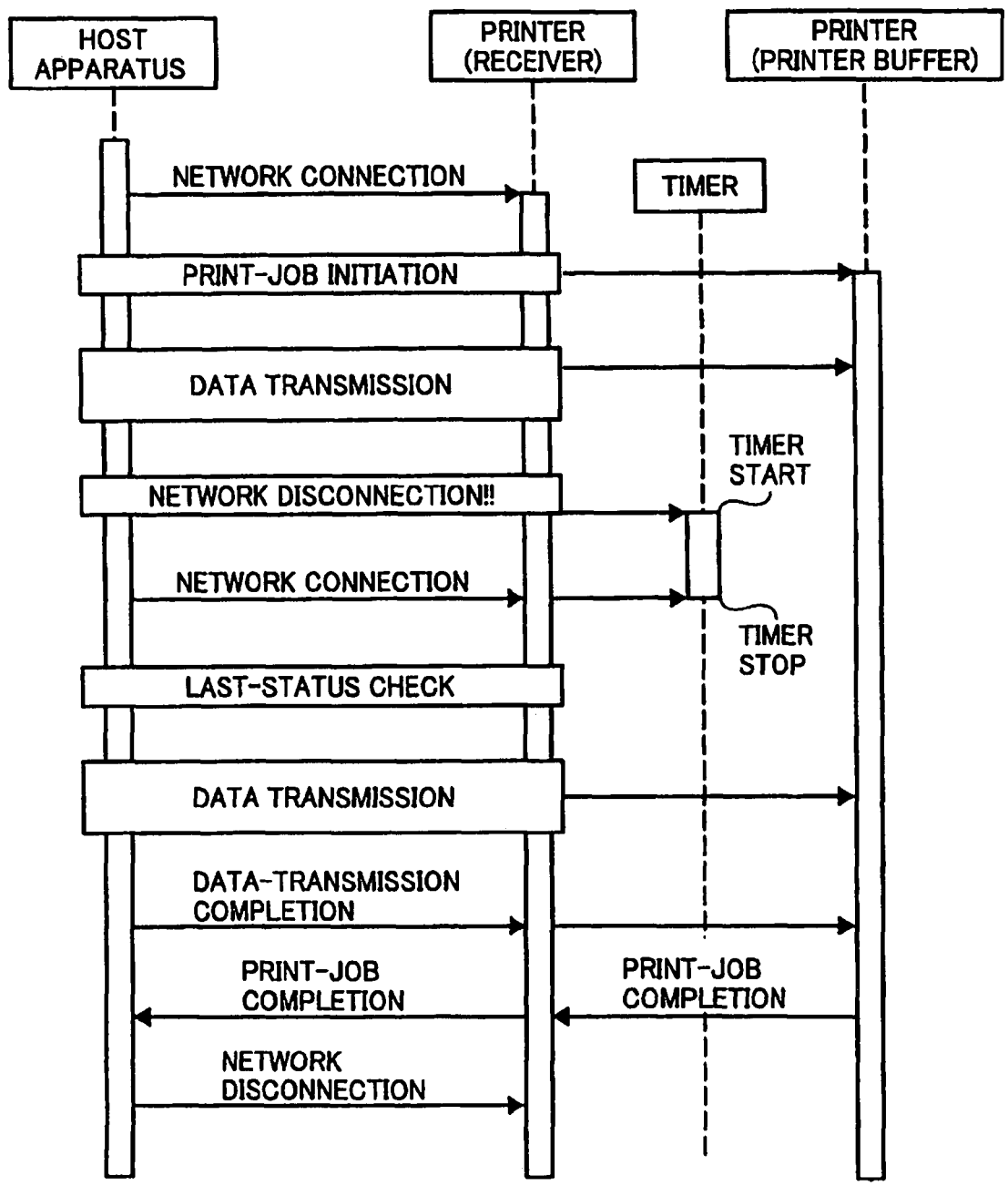
FIG. 20 is a sequence diagram for explaining an exemplary printing process when the network reconnection takes place before time-out.

FIG. 20 is a sequence diagram for explaining an exemplary printing process when the network reconnection takes place before time-out. If the network reconnection takes place before time-out, the timer stops and the printer performs an appropriate process in response to a command received from the host apparatus.

Figure 21:
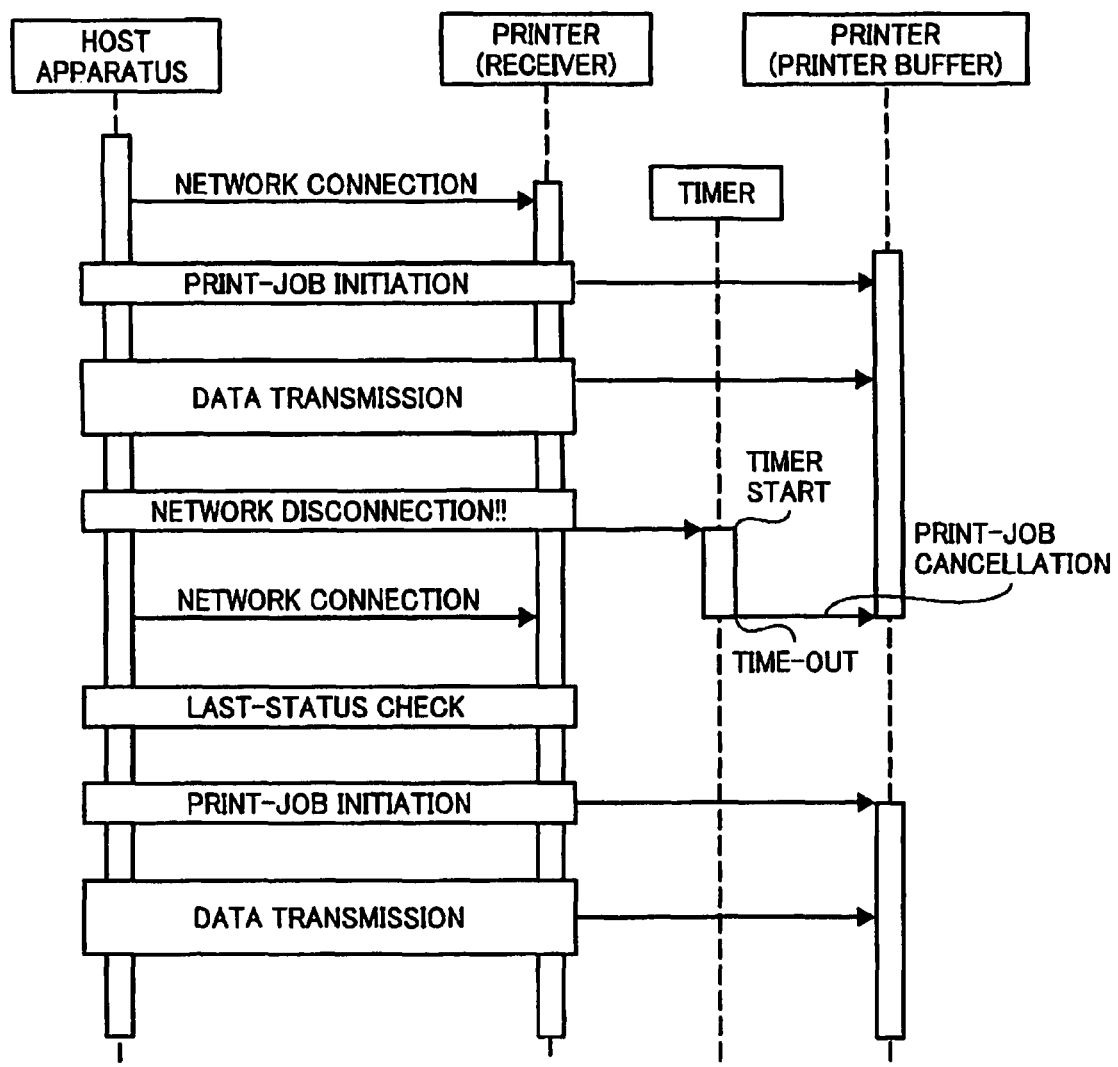
FIG. 21 is a sequence diagram for explaining an exemplary printing process when a time-out period has passed.

FIG. 21 is a sequence diagram for explaining an exemplary printing process when the time-out period has passed. If the time-out period has passed, the print job is cancelled.

Referring back to FIG. 19, after the host apparatus is reconnected to the printer, the inquiring unit 111 of the host apparatus sends an inquiry about the last status (hereinafter, "last-status acquisition command") to the printer to check an extent to which the printer has received the print job before the network disconnection.

Upon receiving the last-status acquisition command from the host apparatus, the response unit 104 of the printer sends the total number of the received pieces of the print data as a response corresponding to the last-status acquisition command (hereinafter, "last-status acquisition response") to the host apparatus.

The re-transmission unit 112 of the host apparatus calculates a total amount of the print data that has been received by the printer from the total number of the received pieces of the print data and a size of data per piece. The size of data per piece, i.e., data to be sent at each transmission is decided based on the protocol. The host apparatus then sends the un-received pieces of the print data, i.e., data subsequent to the data that has been received before the network disconnection. Thus, in the present embodiment, after the network reconnection takes place, the host apparatus receives the total number of the received pieces of the print data from the printer, calculates the total amount of the received pieces of the print data by the printer, and sends only the un-received pieces of the print data to the printer. In other words, the data received by the printer before the network disconnection is efficiently used after the network reconnection, i.e., re-transmission of the received data is saved.

The printer holds the print job without cancelling it when the network disconnection occurs. That is, the printer is ready to print the print data received from the host apparatus. The printer adds one to the total number of the received pieces of the print data each time when the printer completes receiving of one piece of the print data.

In this manner, when the network is disconnected, the session is maintained without being closed; when the network reconnection takes place, the data received before the network disconnection is efficiently used after the network reconnection. This makes it possible to mitigate a negative effect caused by the network disconnection in the network printing system, and eliminate the need to re-transmit the received data. Therefore, the network printing system capable of the stable data-transmission and printing with regardless of the network quality is provided.

Figure 22:
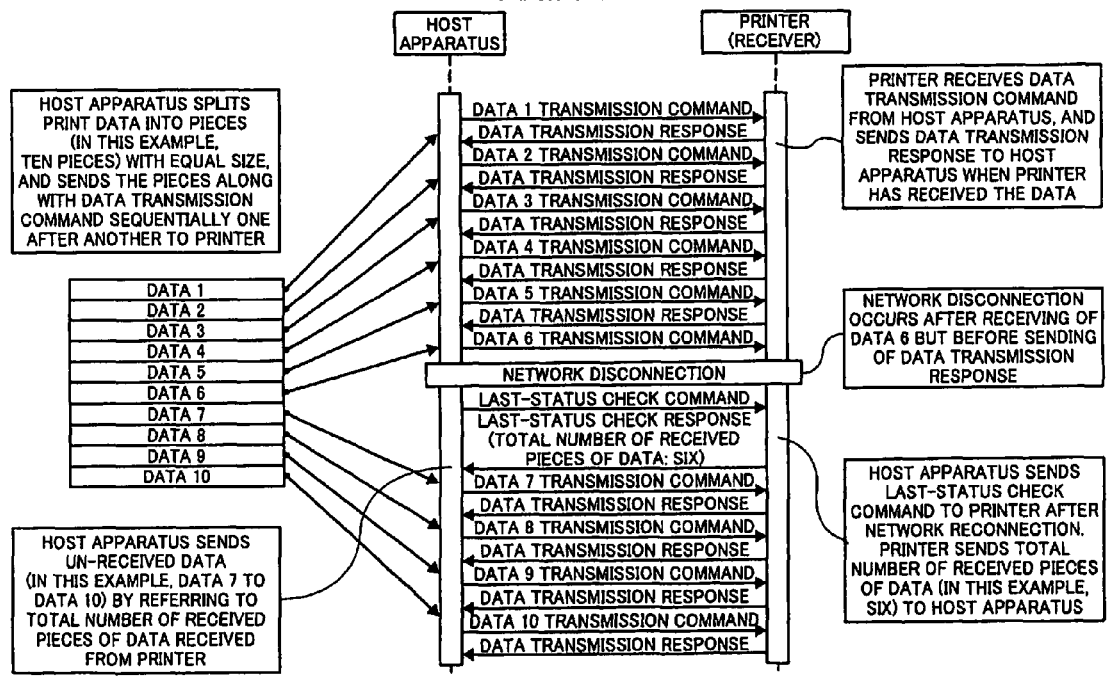
FIG. 22 is a sequence diagram for explaining an exemplary data transmission when a network disconnection occurs at the end of receiving of n-th data.

FIG. 22 is a sequence diagram for explaining an exemplary data transmission when the network disconnection occurs at the end of receiving of the n-th data. The data shown in FIG. 22 is split into ten pieces including data 1 to data 10 with a substantially equal size, e.g., up to 16 kilobytes. More particularly, the data represents a document having ten pages that is created on the host apparatus. Each piece of data represents one page of the document. Data 1 to Data 10 correspond to Page 1 to Page 10 of the document, respectively. The host apparatus sends the pieces of the data shown in FIG. 22 sequentially from Data 1 to Data 10 to the printer (receiver).

In the example shown in FIG. 22, the network disconnection occurs immediately after completion of Data 6 before the printer sends the print data transmission response to the host apparatus. In this case, when the network reconnection takes place, the host apparatus sends a command to check a status immediately before the network disconnection (hereinafter, "last-status check command") to the printer. The printer then replies the number of the received pieces of the data (i.e., six in this example) to the host apparatus. After that, the host apparatus sends only the un-received pieces of the data (i.e., Data 7 to Data 10 in this example) to the printer.

Although the data is split into ten pieces in the example explained with reference to FIG. 22, it is allowable to split the data in the number of pieces that is more or lesser than ten depending on a type of the application installed in the host apparatus. Alternatively, it is possible to send the entire data without splitting into pieces.

Figure 23:
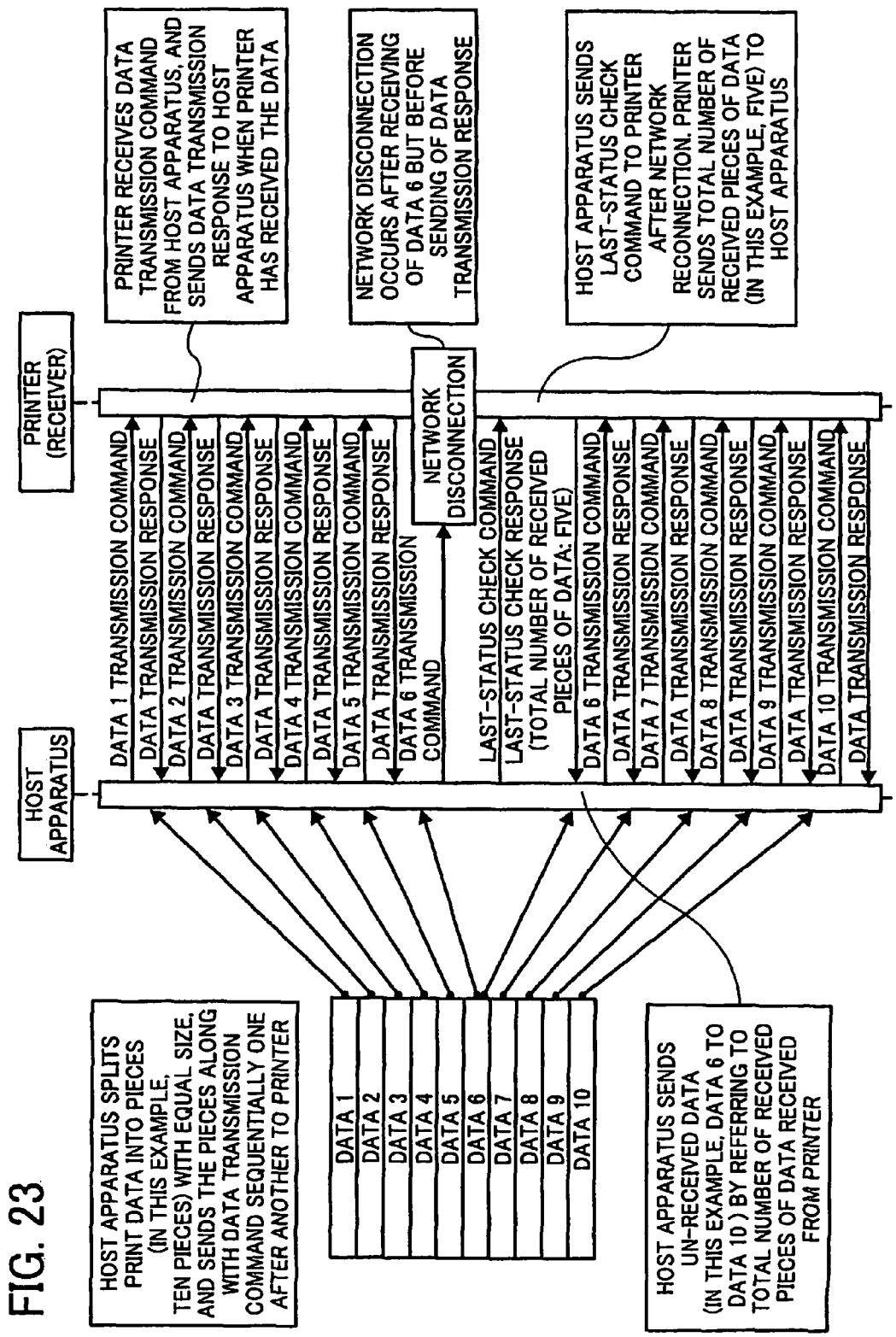
FIG. 23 is a sequence diagram for explaining an exemplary data transmission when a network disconnection occurs in the middle of receiving n-th data.
Figure 24:
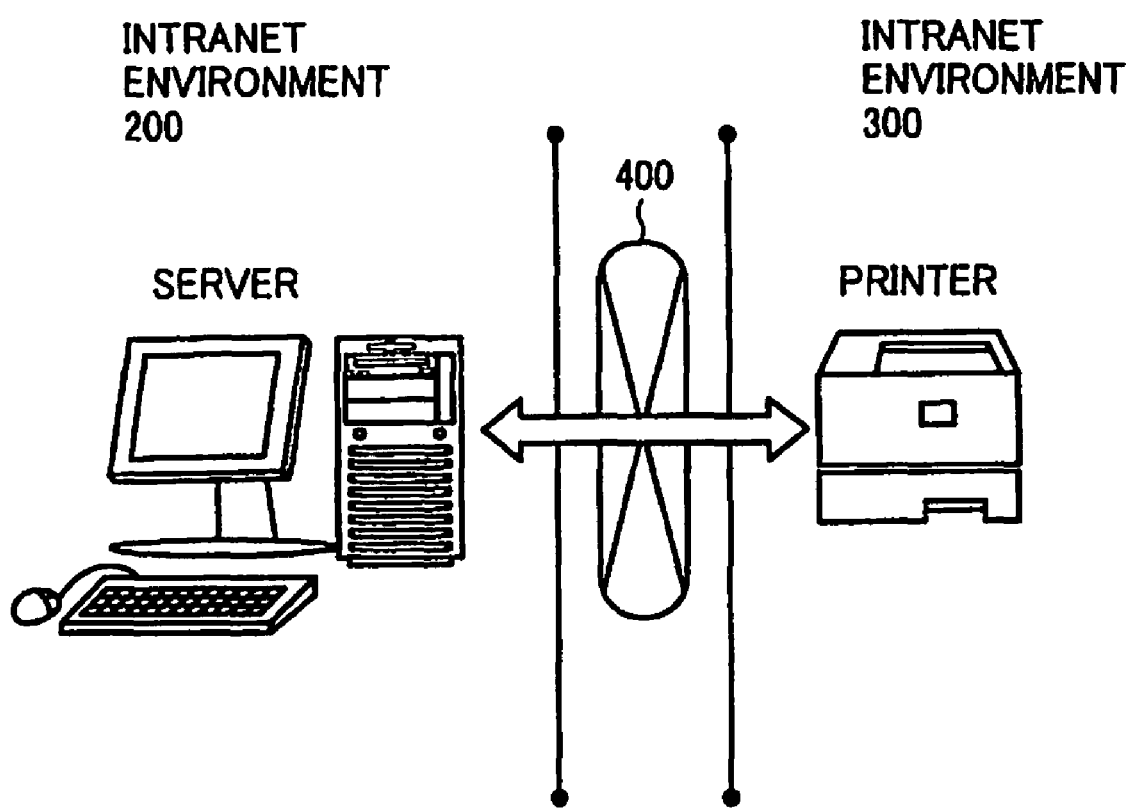
FIG. 24 is a schematic diagram for explaining a conventional network printing system.

FIG. 23 is a sequence diagram for explaining an exemplary data transmission when the network disconnect occurs in the middle of receiving the n-th data. In the example shown in FIG. 23, the network disconnection occurs when the printer is receiving Data 6. In this case, when the network reconnection takes place, the host apparatus sends the last-status check command to the printer. The printer then sends the number of the received pieces of the data (i.e., five in this example) to the host apparatus. After that, the host apparatus sends the un-received pieces of the data (i.e., Data 6 to Data 10 in this example) to the printer.

In this manner, even if an error such as a paper-out condition, a paper jam condition, or a toner empty condition occurs in the higher level printer while printing the print data and, in the conventional system, the user has to manually solve the error to continue the printing, the lower level printer substitutively performs printing of the print data in place of the higher level printer. Therefore, the print data is smoothly printed out, which increases the reliability of the printing system. Moreover, the printing system maintains the session without being closed at the network disconnection, and efficiently uses the data received before the network disconnection after the network reconnection. This makes it possible to mitigate the negative effect caused by the network disconnection in the printing system and eliminate the need to re-transmit the received data. Thus, the stable data transmission and the stable printing less affected by the network quality is provided. In the conventional technology, if the network disconnection occurs in a situation that the printer device receives former pages of the print data but does not receive latter pages, the host apparatus has to send the former pages again. In contrast, in the present embodiment, the host apparatus sends only the un-received latter pages after the network reconnection takes place by referring to the total amount of the received print data that is obtained by calculating the total number of the received pages received from the printer as a response. Thus, the received pages are efficiently used after the network reconnection takes place, which saves the re-transmission of the received data.

In other words, because of the substitutive printing process, the print data is successfully printed irrespective of an error in one or more printers in the network printing system. That enhances the reliability of the network printing system.

Meanwhile, printer information (e.g., print status and number of printed pages) of a lower level printer is appended to printer information of a corresponding immediate higher level printer. Such appended printer information of all the printers is sent to the host apparatus. As a result, the host apparatus is able to accurately obtain the information regarding the total number of printed pages and the print status of each printer in the network printing system.

Moreover, based on the printer information, the host apparatus generates a print report. The print report is circulated to each printer such that it is possible to crosscheck whether the substitutive printing process is performed properly. Furthermore, a lower level printer that performs the substitutive printing at the last is instructed to print the print report. That enables a user to confirm the number of pages printed at each printer.

Thus, according to an aspect of the present invention, a plurality of printers is connected to perform a substitutive printing process thereby enabling reliably printing of print data even if an error occurs in one or more printers.

Moreover, the print data is successfully printed without interruption thereby reducing the man-hours that are consumed in system recovery in case of an interruption.

Furthermore, lower-cost printers can be provided by using an application shared by the main printer and the sub-printers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system comprising:
 a host apparatus connected to a network;
 at least two printer devices, each printer device assigned a sequential level, from lower level to upper level, the at least two printer devices connected to the network and that receive a print job including print data and a series of process commands from a host apparatus and print the print job in accordance with the process commands, a first printer device among the printer devices including a session setup unit that sets up a session between the host apparatus and a second printer device among the printer devices, receives a print job from the host apparatus, stores the print job, and sends the print job to the second printer device;

a job synchronizing unit that maintains if the first printer device is printing the print job, synchronization between the print job that has been stored in the first printer device and the print job that has been stored in the second printer device;

a network-disconnection preparation unit that takes measures, if a network disconnection occurs between the host apparatus, so as not to cancel the print job that has been stored in each of the first printer device and the second printer device and not to close the session that has been setup between the host apparatus and the second printer device, unless a network disconnection occurs in middle of receiving a first piece of the print data from the host device, in which case the network-disconnection preparation unit cancels the print job that has been stored in the first printer device and the second printer device, and closes the session that has been setup between the host apparatus and the second printer device; and a network connecting unit that connects the host apparatus and the at least two printer devices via a network by transmitting a printer occupation command from the host apparatus to the printer devices successively, and also sends a withhold command to withhold the printing at the lower level printer device;

the host apparatus including a sending unit that sends, if a network reconnection takes place after the network disconnection between the first printer device, only un-received print data to the first printer device by referring to the print data in the print job that has been stored in the first printer device, the un-received print data being print data that the first printer device could not receive from the host apparatus due to the network disconnection.

2. The printing system according to claim 1, wherein if a time has passed since the network disconnection has occurred and the print job is stored in the first printer device and the second printer device, but no network reconnection takes place, the network-disconnection preparation unit cancels the print job that has been stored in the first printer device and the second printer device and closes the session that has been setup between the host apparatus and the second printer device.

3. The printing system according to claim 1, wherein if the network disconnection occurs in middle of receiving an N-th piece of the print data, where N is an integer larger than 1, the network-disconnection preparation unit takes measures so as not to cancel the print job that has been stored in the first printer device and the second printer device and not to close the session that has been setup between the host apparatus and the second printer device.

4. A printer device that is connected to a host apparatus via a network, receives a print job including print data and a series of process commands from the host apparatus, and prints the print job in accordance with the process commands, the printer device comprising:

a session setup unit that sets up a session with the host apparatus and an external printer device, receives a print job from the host apparatus, stores the print job, and sends the print job to the external printer device;

a job synchronizing unit that maintains if the printer device is printing the print job, synchronization between the print job that has been stored in the printer device and the print job that has been stored in the external printer device;

a network-disconnection preparation unit that takes measures, if a network disconnection occurs between the host apparatus, so as not to cancel the print job that has been stored in the printer device and not to close the session that has been setup between the host apparatus and the external printer device, unless the network disconnection occurs in middle of receiving a first piece of the print data from the host device, in which case the network-disconnection preparation unit cancels the print job that has been stored in the printer device, and closes the session that has been setup between the host apparatus and the external printer device; and a response unit that sends, in response to an inquiry received from the host apparatus if a network reconnection takes place after the network disconnection between the printer device, total number of pieces of the print data that have been stored in the printer device to the host apparatus; and a network connecting unit that connects the host apparatus and the external printer device via a network by transmitting a printer occupation command from the host apparatus to the external printer device, and also sends a withhold command to withhold the printing at the external printer device.

5. The printing device according to claim 4, wherein if a time has passed since the network disconnection has occurred and the print job is stored in the first printer device and the second printer device, but no network reconnection takes place, the network-disconnection preparation unit cancels the print job that has been stored in the first printer device and the second printer device and closes the session that has been setup between the host apparatus and the second printer device.

6. The printer device according to claim 4, wherein if the network disconnection occurs in middle of receiving an N-th piece of the print data, where N is an integer larger than 1, the network-disconnection preparation unit takes measures so as not to cancel the print job that has been stored in the printer device, and not to close the session that has been setup between the host apparatus and the external printer device.

7. A host apparatus that is connected to the printer device according to claim 4 via a network and that sends a print job including print data and a series of process commands to the printer device, the host apparatus comprising:

an inquiring unit that sends, if a network reconnection takes place after a network disconnection between the printer device, an inquiry to the printer device about a status of print data that has been received by the printer device at a time point the network disconnection occurred; and a sending unit that sends, by referring to a response corresponding to the inquiry received from the printer device, un-received print data to the printer device, the un-received print data being print data that the printer device could not receive from the host apparatus due to the network disconnection.

8. A non-transitory computer readable medium that includes a computer program including computer executable instructions which when executed on a computer causes the computer to control a printer device that is connected to a host apparatus via a network, receives a print job including print data and a series of process commands from the host apparatus, and prints the print job in accordance with the process commands, the computer program causing the computer to execute:
  setting up a session with the host apparatus and an external printer device, receiving a print job from the host apparatus, storing the print job, and sending the print job to the external printer device;
  causing a network connecting unit to connect the host apparatus and the external printer device via a network by transmitting a printer occupation command from the host apparatus to the external printer device, and also sends a withhold command to withhold the printing at the external printer device,
  maintaining, if the printer device is printing the print job, synchronization between the print job that has been stored in the printer device and the print job that has been stored in the external printer device;
  taking measures, if a network disconnection occurs between the host apparatus, so as not to cancel the print job that has been stored in the printer device and not to close the session that has been setup between the host apparatus and the external printer device, unless the network disconnection occurs in middle of receiving a first piece of the print data from the host device, in which case the network-disconnection preparation unit cancels the print job that has been stored in the printer device, and closes the session that has been setup between the host apparatus and the external printer device; and
  sending, in response to an inquiry received from the host apparatus if a network reconnection takes place after the network disconnection between the printer device, total number of pieces of the print data that have been stored in the printer device to the host apparatus.

9. A non-transitory computer readable medium that includes a computer program including computer executable instructions which when executed on a computer causes the computer to control a host apparatus that is connected to the printer device according to claim 4 via a network and that sends a print job including print data and a series of process commands to the printer device, the computer program causing the computer to execute:
  sending, if the network reconnection takes place after a network disconnection between the printer device, an inquiry to the printer device about a status of print data that has been received by the printer device at a time point the network disconnection occurred; and
  sending, by referring to a response corresponding to the inquiry received from the printer device, un-received print data to the printer device, the un-received print data being print data that the printer device could not receive from the host apparatus due to the network disconnection.

* * * * *